US007406537B2

(12) United States Patent
Cullen

(10) Patent No.: US 7,406,537 B2
(45) Date of Patent: Jul. 29, 2008

(54) DYNAMIC SUBSCRIPTION AND MESSAGE ROUTING ON A TOPIC BETWEEN PUBLISHING NODES AND SUBSCRIBING NODES

(75) Inventor: William Cullen, Cambridge, MA (US)

(73) Assignee: Progress Software Corporation, Bedford, MA (US)

( * ) Notice: Subject to any disclaimer, the term of this patent is extended or adjusted under 35 U.S.C. 154(b) by 937 days.

(21) Appl. No.: 10/773,803

(22) Filed: Feb. 6, 2004

(65) Prior Publication Data

US 2005/0021622 A1    Jan. 27, 2005

Related U.S. Application Data

(63) Continuation-in-part of application No. 10/304,992, filed on Nov. 26, 2002, now Pat. No. 7,039,671.

(60) Provisional application No. 60/445,543, filed on Feb. 6, 2003.

(51) Int. Cl.
*G06F 15/173* (2006.01)
(52) U.S. Cl. ..................... 709/238
(58) Field of Classification Search ............ 709/238, 709/203, 217
See application file for complete search history.

(56) References Cited

U.S. PATENT DOCUMENTS

| | | | | |
|---|---|---|---|---|
| 5,245,616 | A * | 9/1993 | Olson | ............ 714/748 |
| 6,154,781 | A | 11/2000 | Bolam et al. | |
| 6,298,455 | B1 | 10/2001 | Knapman et al. | |
| 6,336,119 | B1 | 1/2002 | Banavar et al. | |
| 6,452,934 | B1 * | 9/2002 | Nakata | ............ 370/428 |
| 6,484,198 | B1 * | 11/2002 | Milovanovic et al. | ....... 709/218 |
| 6,643,682 | B1 | 11/2003 | Todd et al. | |
| 6,728,715 | B1 | 4/2004 | Astley et al. | |
| 6,901,447 | B2 * | 5/2005 | Koo et al. | ............ 709/227 |

(Continued)

OTHER PUBLICATIONS

Abbreviated Examination Report, GB0517847.0, Dec. 1, 2005, 1 page.

*Primary Examiner*—David Y Eng
(74) *Attorney, Agent, or Firm*—Fenwick & West LLP

(57) ABSTRACT

A system for dynamic message routing on a topic between publishing nodes and subscribing nodes includes a plurality of message queues, at least one topic/node table, a subscribing module, a publishing module, and other modules to send messages between one or more publisher and one or more subscribers. These modules are coupled together by a bus in a plurality of nodes and provide for the dynamic message routing on a topic between publishing nodes and subscribing nodes. The message queues store messages at each node for delivery to subscribers local to that node. The topic/node table lists which clients subscribe to which topics, and is used by the other modules to ensure proper distribution of messages. The subscribing module is use to establish a subscription to a topic for that node. The publishing module is used to identify subscribers to a topic and transmit messages to subscribers dynamically. The other modules include various devices to optimize message communication in a publish/subscribe architecture operating on a distributed computing system. The present invention also includes a number of novel methods including: a method for publishing a message on a topic, a method for forwarding a message on a topic, a method for subscribing to messages on a topic, a method for automatically removing subscribers, a method for direct publishing of messages, and methods for optimizing message transmission between nodes.

16 Claims, 18 Drawing Sheets

U.S. PATENT DOCUMENTS 6,944,662 B2 * 9/2005 Devine et al. ............... 709/225
6,983,479 B1 * 1/2006 Salas et al. .................... 725/23
7,096,263 B2 * 8/2006 Leighton et al. ............ 709/224
7,103,054 B2 * 9/2006 Novaes ....................... 370/401

* cited by examiner

DYNAMIC SUBSCRIPTION AND MESSAGE ROUTING ON A TOPIC BETWEEN PUBLISHING NODES AND SUBSCRIBING NODES

CROSS-REFERENCES TO RELATED APPLICATIONS

The present application claims priority from U.S. Provisional Patent Application Ser. No. 60/445,543, entitled "Dynamically Routing Messages Relating to a Topic of Interest between Publisher Nodes and Subscriber Nodes" filed on Feb. 6, 2003, which is incorporated herein by reference. The present application is a continuation-in-part of U.S. Utility patent application Ser. No. 10/304,992, entitled "Dynamically Routing Messages between Software Application Programs Using Named Routing Nodes and Named Message Queues" filed on Nov. 26, 2002 now U.S. Pat. No. 7,039,671, which is incorporated herein by reference in its entirety.

BACKGROUND OF THE INVENTION

1. Field of the Invention

The present invention relates to systems and methods for sending and receiving messages. In particular, the present invention relates to a system and method for sending and receiving messages using a publish/subscribe architecture. Still more particularly, the present invention relates to devices and methods for efficiently implementing a publish/subscribe messaging system on a distributed computing architecture.

2. Description of the Background Art

The use and proliferation of distributed computing networks is ever increasing. With the advent and business use of the Internet, the need for more efficient distributed computing system has become critical. The business use of the Internet has forced the integration of disparate computing environments with distributed computing systems that enable data transfer between such disparate systems. However, this in turn has created a need for better messaging systems that can handle amount of data and communication that are needed to effectively let disparate systems operate together and share information.

There have been attempts in the prior art to provide a solution to communication and data transfer problems associated with distributed computing. These attempts in the prior art attempt to solve this messaging problem by adding messaging systems that allow different applications to communicate with each other such as Message Oriented Middleware ("MOM") architectures. MOM systems include software that performs the message-handling tasks that enable disparate software applications to communicate without requiring programmers know the details of the message handling operations. MOM architectures often require additional message processors to handle such message processing responsibilities. Thus, there is a significant amount of administrative overhead associated with such architectures. Moreover, unless messages are at a consistent level and a high volume, the added administrative processing resources can be underutilized and waste bandwidth. This is especially true as networks and systems grow in size and scale.

Another issue in the prior art is that most messaging systems provide only point-to-point communication methods. With point-to-point communication methods, there is significant processing overhead associated with establishing a point-to-point connection to every destination when a single message is sent to multiple destinations. As the distributed networks become more complex this only increases the amount of computing bandwidth that gets consumed. Further, the topology and connectivity changes are continual, especially in distributed computing architectures. This adds to the administrative overhead of existing point-to-point messaging systems because they must propagate such changes for each message.

Therefore, what is needed is a system and methods for implementing a publish/subscribe messaging system that overcomes the limitations found in the prior art.

SUMMARY OF THE INVENTION

The present invention overcomes the deficiencies and limitations of the prior art by providing a system and method for dynamic subscription and message routing on a topic between publishing nodes and subscribing nodes. The system of the present invention includes a plurality of message queues, at least one topic/node table, a subscribing module, a publishing module, and other modules to send messages between one or more publisher and one or more subscribers. These modules are coupled together by a bus and provide for the dynamic subscription and message routing on a topic between publishing nodes and subscribing nodes. The dynamic subscription and message routing system includes a plurality of nodes each having aforementioned modules. The message queues store messages at each node for delivery to subscribers remote to that node. The topic/node table lists which clients subscribe to which topics, and is used by the other modules to ensure proper distribution of messages. The subscribing module is used to establish and remove a subscription to a topic for that node and dynamically route and propagate the subscription. The invention also automatically terminates a subscription after a connection is unavailable to dynamically maintain the subscriptions. The publishing module is used to identify subscribers to a topic and transmit messages to subscribers dynamically. The other modules include various processes to optimize message communication in a publish/subscribe architecture operating on a distributed computing system. A particular advantage of the present invention is the dynamic nature of the subscriptions and publishing such that a client need only subscribe to a topic, and messages for that topic are dynamically and automatically sent to throughout the system of brokers without any manual or administrative operations required, regardless of how the topology of the network changes or what connections become available or unavailable.

The present invention also includes a number of novel methods including: a method for publishing a message on a topic, a method for forwarding a message on a topic, a method for subscribing to messages on a topic, a method for automatically removing subscribers, a method for direct publishing of messages, and methods for optimizing message transmission between nodes.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION OF THE PREFERRED EMBODIMENTS

Figure 1:
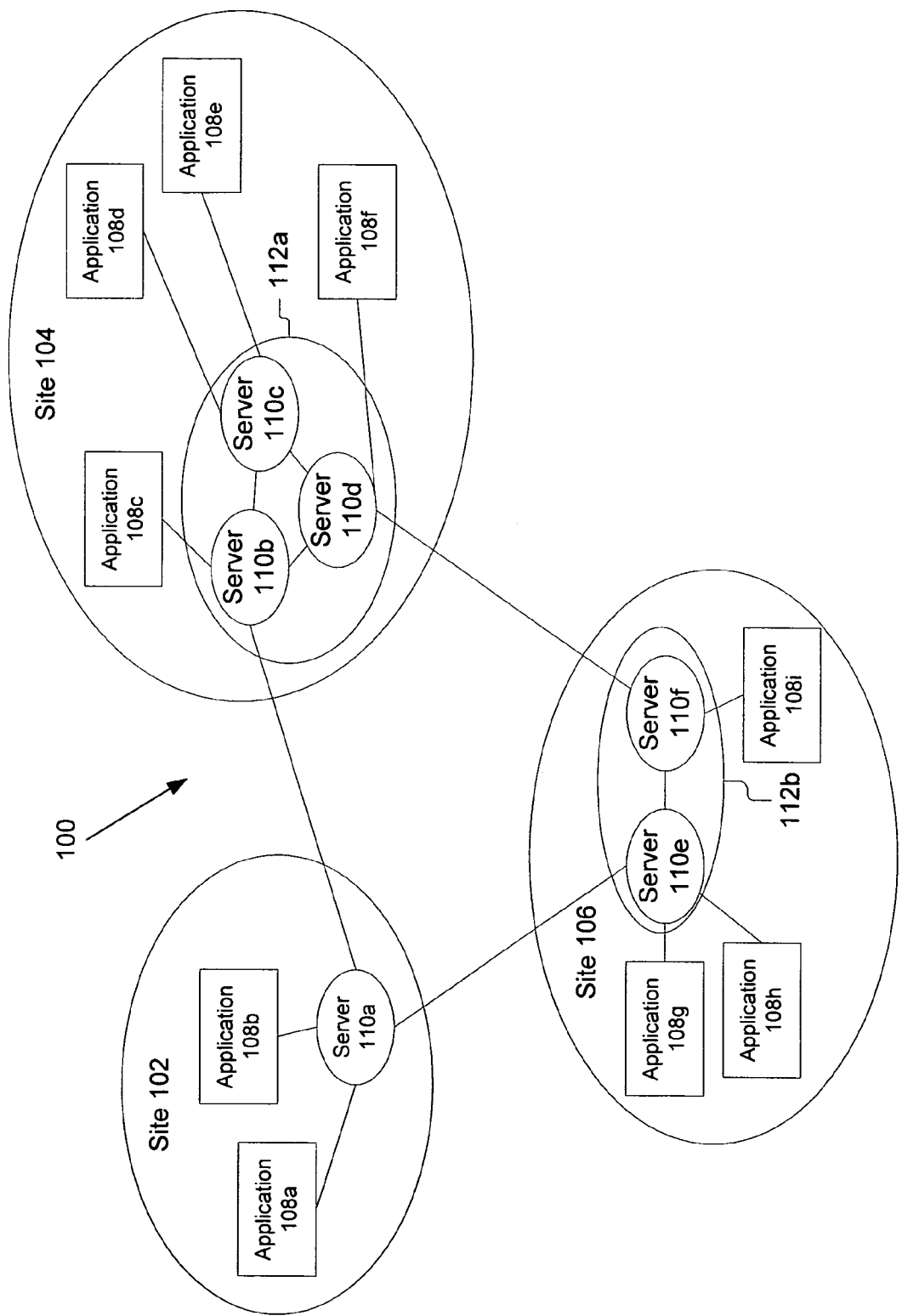
FIG. 1 is a block diagram of an exemplary dynamic, distributed computer system according to the present invention.

A system and method for dynamic subscription and message routing on a topic between publishing nodes and subscribing nodes is described. More specifically, the subscriptions are demand based and dynamically maintained so the brokers are not required to administer or maintain them. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to a few nodes and publishing on a topic between a publishing node and a subscribing node. However, the present invention applies to any distributed computing system that has publish and subscribe capabilities, and may include significantly more nodes, brokers, publishers, subscribers, and topics.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be an entire messaging system or only portions of such a system. For example, the present invention can operate with an information system that need only be a broker in the simplest sense to process messages. The information system might alternately be the system described below with reference to FIGS. 3 and 4. Thus, the present invention is capable of operating with any information system from those with minimal functionality to those providing all the functionality disclosed herein.

Referring now to FIG. 1, an exemplary distributed computing system 100 upon which the present invention operates is shown. The distributed computing system 100 comprises a plurality of sites 102, 104, 106, a plurality of nodes or servers 110a-110f some of which are grouped into clusters 112a, 112b, and a plurality of client applications 108a-108i. The distributed computing system 100 is distributed over a plurality of sites 102, 104, 106 that may be physically and geographically separate. At each site at least one server 110 or cluster 112 couples to client applications 108 for performing computations and transferring data. The sites 102, 104, 106 are coupled for communication by establishing connections between the servers 110a, 110b, 110d, 110e, and 110f. An exemplary node 110 is described below with reference to FIGS. 3 and 4. The distributed computing system 100 is simply an exemplary configuration illustrating that: 1) a single sever 110a may be a site 102 and be coupled to multiple applications 108a, 108b, 2) a site 106 may have a plurality of servers 110e and 110f grouped and coupled as a cluster 112b, and 3) the servers 110e and 110f may be respectively coupled to associated applications 108g-i. Those skilled in the art will recognize that this topology is just an example for describing the present invention, and that the present, invention may operate on any type of topology. The details of distributed computing system 100 are more fully detailed and enabled in U.S. Utility patent application Ser. No. 10/304,992, entitled "Dynamically Routing Messages between Software Application Programs Using Named Routing Nodes and Named Message Queues" filed on Nov. 26, 2002, which is incorporated herein by reference in its entirety.

Figure 2:
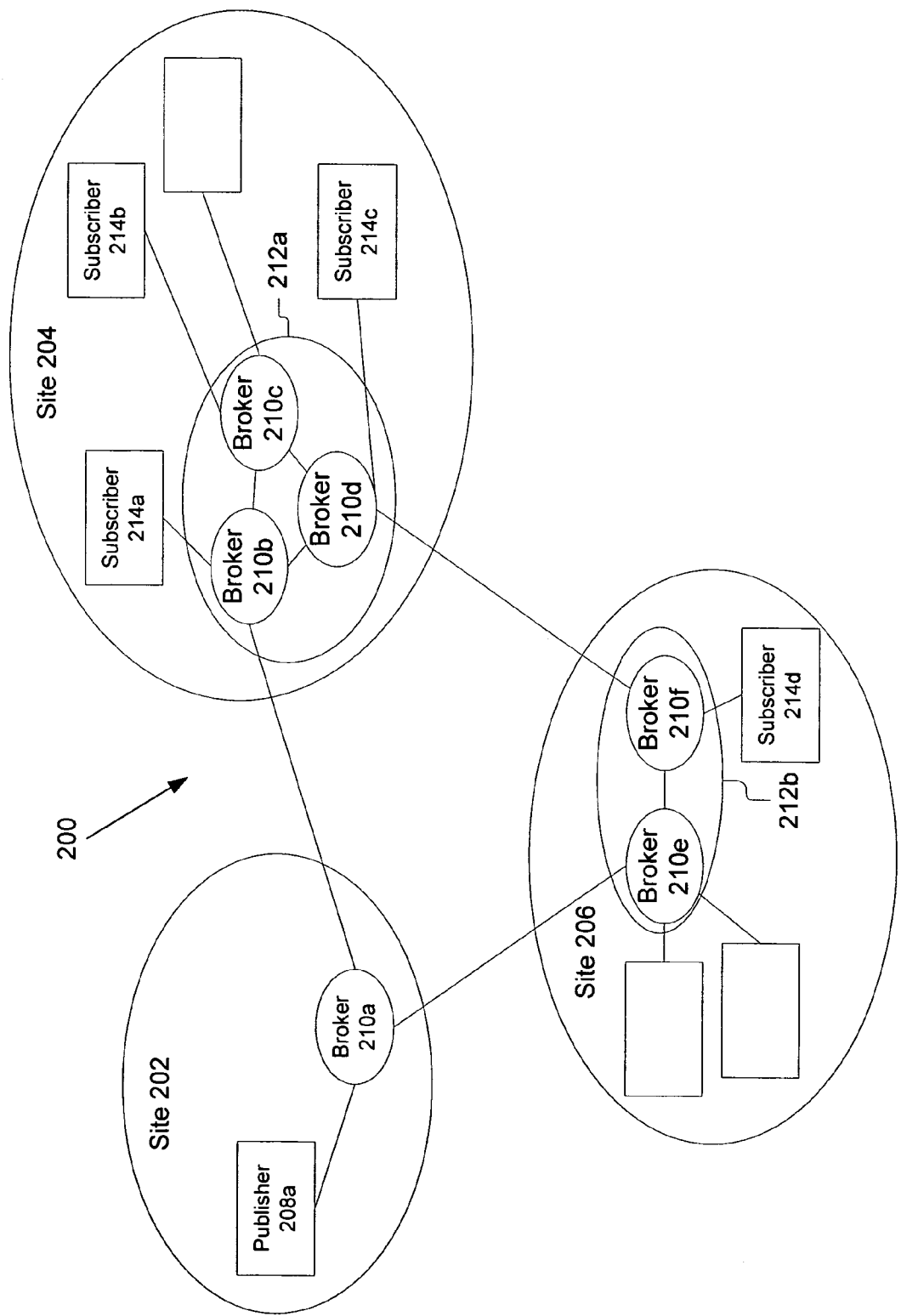
FIG. 2 is a block diagram of an exemplary architecture for a publish/subscribe system that operates on the system of FIG. 1.

FIG. 2 shows an exemplary publish/subscribe architecture 200 that operates on the distributed computing system 100 to process messages. The publish/subscribe architecture 200 includes at least one publisher 208a, a plurality of brokers 210a-210f, and a plurality of subscribers 214a-214d. A message is defined broadly to refer to one or more data packets that can be generated by a software application program 108a-i which includes control information (such as a name or label associated with a message queue and/or indicia pertaining to one or more topics of interest that can be located on the broker 210a-210f) and payload data that includes, for example, data relevant to the underlying transaction. A publisher 208a is a client application that generates a message and sends the message and an associated topic to a broker 210a for publication (routing to subscribers). The publisher 208a is coupled for communication with a broker 210a. Similarly, a subscriber 214 is a client application that identified a topic for which it wants to receive all messages. The subscribers 214a-d are coupled to respective brokers 210b-d, 210f.

In one embodiment, the broker 210a-f is a set of instructions and or other appropriate elements that enable a digital processing device to operate within the publish/subscribe architecture 200. The brokers 210a-f can, for example, operate on or otherwise manipulate messaging data (e.g., network connection data, topic indicia, named message queues, routing path information, hop and other reference counts, time-out counter, message location data, pointers to named message queues and buffers, named cluster and message queue information, load balancing data, resource utilization/availability information and other prioritized information relating to the selection of digital data processors, static data, dynamically changing runtime data, processor grouping and relationship information, access authorization and encryption information, network performance information, software application parameters/data, licensing information, status data, commands, and/or any other type of data desirable for the proper operation of the publish/subscribe architecture 200).

The brokers 210a-f are coupled to client applications that can act either as subscribers 214 or publishers 208. Brokers 210a-f can concurrently act as a publishing node, a routing node, a forwarding node and a subscribing node, or any subset of these depending on what nodes, subscribers and/or publishers are coupled to a broker 210a-f. A publishing node refers to a node where messages of interest are published by client applications. A routing node can be both a publishing and a subscribing node at the same time with regard to different topics. A forwarding node refers to a node that receives messages from the publishing node, directly or indirectly and forwards messages to the subscribing node. A subscribing node is a node that receives messages on a topic and sends the message to client applications that are subscribers.

In one illustrative embodiment, a broker 210b can be clustered with other brokers 210c, 210d executing on other digital data processing devices 110b-110d or which can be executing on an unclustered digital data processing device 110a, can be considered to be a routing node. A unique name or label (e.g., a Java string of unicode characters, or any other numerical, textual, or combination numerical/textual string, or other indicia) can be assigned to a broker 210b to identify the routing node associated with that broker 210b. Accordingly, messages communicated between brokers 210a-210f can include at least one data packet with a packet header that contains one or more routing node names, topic indicia, and/or queue names for an originating, administrative, transaction, and/or destination node 110. Similarly, processor clusters 212a, 212b can be assigned cluster names, thereby enabling routing node names with the same name, but different cluster names, to coexist and still be differentiated. In one embodiment, a single broker 210a executes on and/or is otherwise associated with a node 110a and/or a single processor cluster. In another embodiment, a single broker can be associated with more than one node or cluster. A cluster will be generally referred to as an aggregation of brokers defined to be one node. The brokers in the cluster retain many of their own behaviors yet obtain routing and security information from the cluster definition. The cluster manages the interbroker connections between brokers in the cluster and its neighbors.

In one illustrative embodiment, a network connection process is communicatively coupled to broker 210 or the broker 210 itself determines network connection information pertaining to the cluster names, routing node names, topic indicia, and/or queue names specified by the broker 210 by accessing, for example, a data structure that maps such names to indicia of previously-selected network addresses. In one embodiment, the previously selected network addresses can be determined by an administrator 420 and communicated to the data structure (which can be, for example, centrally located on a configuration server or distributed (partially or in its entirety) to one or more of the nodes 110 associated with the brokers 210). Alternatively or in combination, at least some, and in one embodiment all, brokers 210 (e.g., those that are adjacent in a network) can communicate during periodic time intervals (e.g., every 15 minutes) and/or upon the occurrence of an event (e.g., a node in a cluster is added, removed, or modified, etc.) by transmitting/receiving informational messages that specify cluster names, routing node names, topic indicia, queue names, network connection information, network hops, network paths, and/or other types of configuration information that enable the broker 210 to communicate, without requiring a user of such processes to manually determine and/or configure network connection parameters. The informational messages enable the broker 210 to obtain up-to-date configuration information about other brokers 210 during runtime and to thereby dynamically and automatically reconfigure their operations to accommodate additions, deletions, and/or modifications to such broker 210 and/or associated hardware and software elements. The informational messages can also enable brokers 210 to identify routing/ network paths between one or more messaging broker processes, by accessing, for example, network hop information contained in such messages.

In one embodiment, one or more processor clusters 112a, 112b can be implemented in accordance with a bus architecture, in which at least some of the nodes 110 provide at least some of the functionality discussed above with respect to the administrative process, without having a separate administrative module 420 to support such functions. Messages transmitted to the processor cluster 112a, 112b from one or more originating and/or destination nodes 110 can be received by one or more nodes 110 based on election criteria, which can be based on, for example, load balancing/performance metrics associated with such nodes 110. A message received by an elected node 110 can be analyzed and subsequently forwarded to one or more other nodes 110 that host relevant software application programs 108 to perform desired functions.

The broker 210 can identify the cluster, routing node, topic indicia, queue names, information about subscribers and topics, and/or network addresses associated with the broker 210 of the selected node, originating node and/or destination mode by, for example, accessing a configuration file, initialization file, messaging data, informational message, and/or any other processor-accessible data structure. The broker 210 of the destination node can determine the network addresses of the node involved in the transaction from the message stored in the message queue 406 and/or by searching the processor-accessible data structures (not shown). If at least one network address for the originating, administrative, and/or transaction node is located, the broker 210 can either directly provide or instruct another process to provide the network address, cluster name, routing node name, topic indicia, queue name, routing/network path, and related transaction details to a network connection process, which can compress, encrypt, encode and/or otherwise manipulate such parameters to form a data packet that can be transmitted to one or more network connection processes associated with such nodes.

This methodology can be substantially repeated for a plurality of transaction messages in a single session between two trading/business partners, as well as, for a plurality of sessions involving potentially numerous sites, corporate divisions, trading partners and/or other entities. As described above, the disclosed technology can scale seamlessly, automatically and dynamically without requiring human interaction to address additions, deletions, and/or modifications to a messaging infrastructure.

Figure 3:
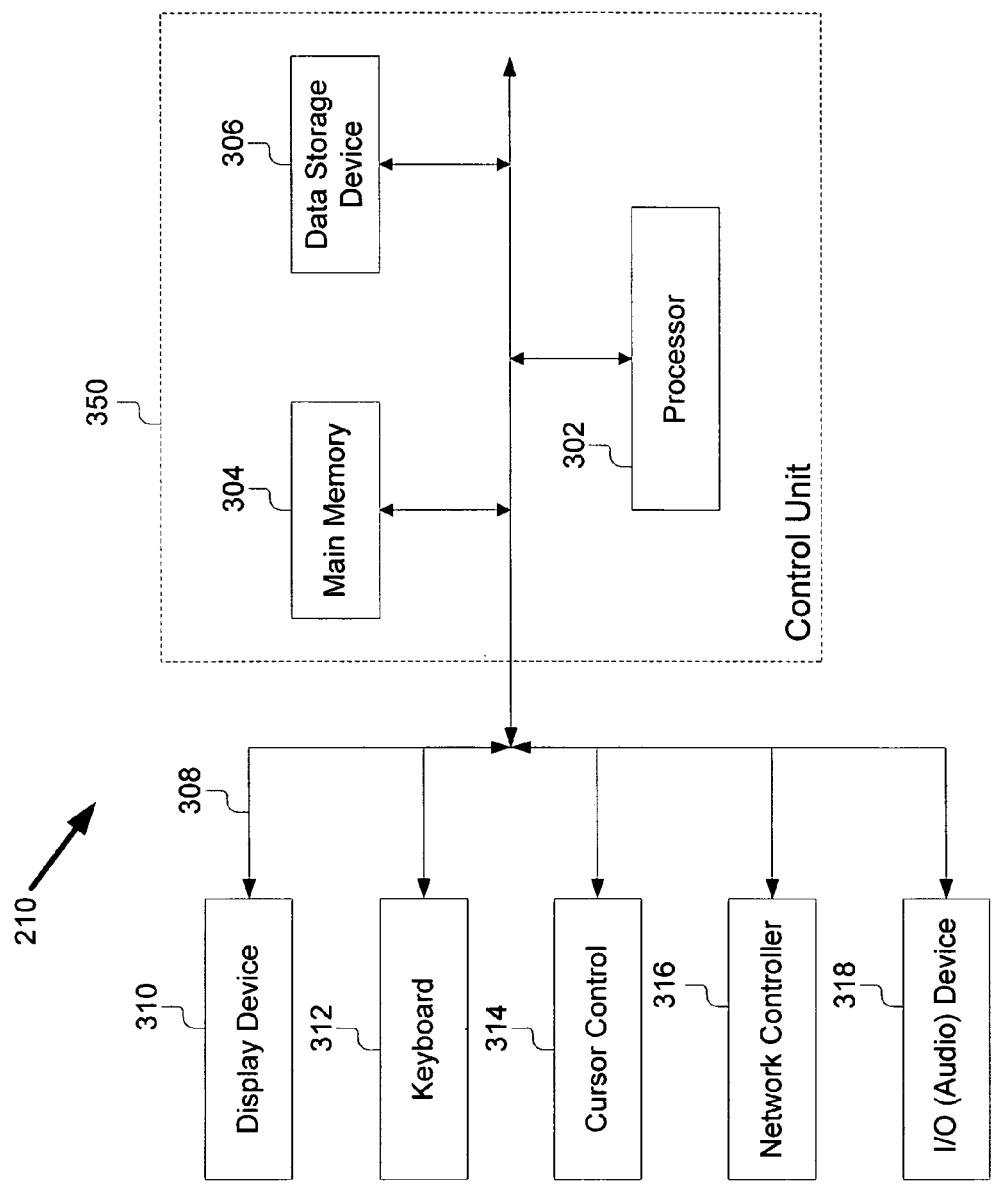
FIG. 3 is a block diagram of a server or node according to the present invention.

FIG. 3 is a block diagram of one embodiment of a broker or node 210 constructed according to the present invention. The broker or node 210 preferably comprises a control unit 350, a display device 310, a keyboard 312, a cursor control device 314, a network controller 316 and one or more input/output (I/O) audio device(s) 318.

Control unit 350 may comprise an arithmetic logic unit, a microprocessor, a general purpose computer, a personal digital assistant or some other information appliance equipped to provide electronic display signals to display device 310. In one embodiment, control unit 350 comprises a general purpose computer having a graphical user interface, which may be generated by, for example, a program written in Java running on top of an operating system like WINDOWS® or UNIX® based operating systems. In one embodiment, one or more application programs are executed by control unit 350 including, without limitation, word processing applications, electronic mail applications, financial applications, and web browser applications.

Still referring to FIG. 3, the control unit 350 is shown including processor 302, main memory 304, and data storage device 306, all of which are communicatively coupled to system bus 308.

Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included.

Main memory 304 stores instructions and/or data that may be executed by processor 302. The instructions and/or data may comprise code for performing any and/or all of the techniques described herein. Main memory 304 may be a dynamic random access memory (DRAM) device, a static random access memory (SRAM) device, or some other memory device known in the art. The memory 304 is described in more detail below with reference to FIG. 4. In particular, the portions of the memory 304 for providing publication, forwarding, subscription, path selection, traffic control and direct publishing will be described.

Data storage device 306 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 308 represents a shared bus for communicating information and data throughout control unit 350. System bus 308 may represent one or more buses including an industry standard architecture (ISA) bus, a peripheral component interconnect (PCI) bus, a universal serial bus (USB), or some other bus known in the art to provide similar functionality. Additional components coupled to control unit 350 through system bus 308 include the display device 310, the keyboard 312, the cursor control device 314, the network controller 316 and the I/O device(s) 318.

Display device 310 represents any device equipped to display electronic images and data as described herein. Display device 310 may be, for example, a cathode ray tube (CRT), liquid crystal display (LCD), or any other similarly equipped display device, screen, or monitor. In one embodiment, display device 310 is equipped with a touch screen in which a touch-sensitive, transparent panel covers the screen of display device 310.

Keyboard 312 represents an alphanumeric input device coupled to control unit 350 to communicate information and command selections to processor 302.

Cursor control 314 represents a user input device equipped to communicate positional data as well as command selections to processor 302. Cursor control 314 may include a mouse, a trackball, a stylus, a pen, a touch screen, cursor direction keys, or other mechanisms to cause movement of a cursor.

Network controller 316 links control unit 350 to a network that may include multiple processing systems. The network of processing systems may comprise a local area network (LAN), a wide area network (WAN) (e.g., the Internet), and/or any other interconnected data path across which multiple devices may communicate. The control unit 350 also has other conventional connections to other systems such as a network for distribution of files (media objects) using standard network protocols such as TCP/IP, http, and SMTP as will be understood to those skilled in the art.

One or more I/O devices 318 are coupled to the system bus 308. For example, the I/O device 318 may be an audio input/ output device 318 equipped to receive audio input via a microphone and transmit audio output via speakers. Audio input may be received through various devices including a microphone within I/O audio device 318 and network controller 316. Similarly, audio output may originate from various devices including processor 302 and network controller 316. In one embodiment, audio device 318 is a general purpose; audio add-in/expansion card designed for use within a general purpose computer system. Optionally, I/O audio device 318 may contain one or more analog-to-digital or digital-to-analog converters, and/or one or more digital signal processors to facilitate audio processing.

It should be apparent to one skilled in the art that control unit 350 may include more or less components than those shown in FIG. 3 without departing from the spirit and scope of the present invention. For example, control unit 350 may include additional memory, such as, for example, a first or second level cache, or one or more application specific integrated circuits (ASICs). Similarly, additional components input/output devices 318 may be coupled to control unit 350 including, for example, image scanning devices, digital still or video cameras, or other devices that may or may not be equipped to capture and/or download electronic data to control unit 350.

Figure 4:
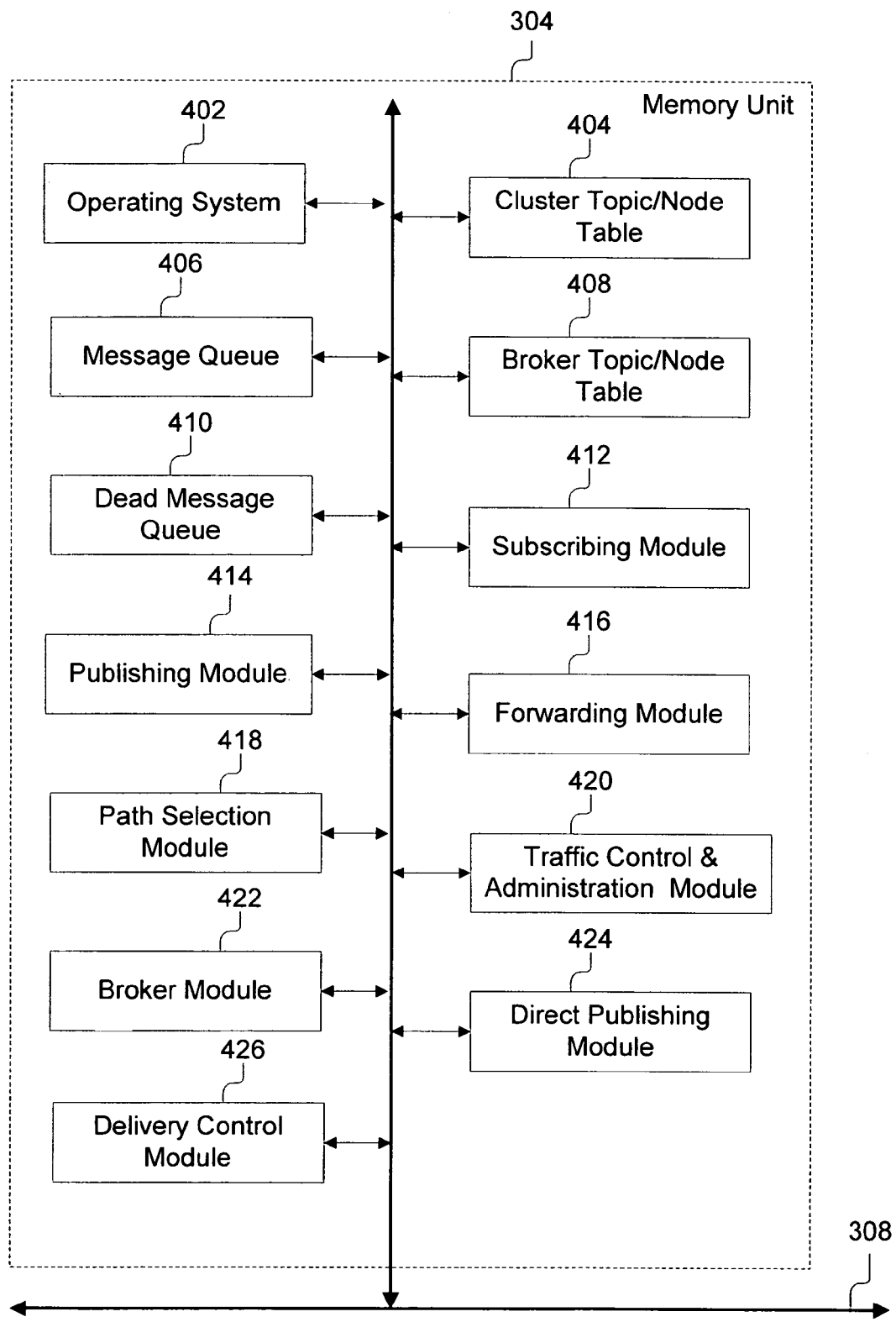
FIG. 4 is a block diagram of the memory of the server of FIG. 3 in accordance with the present invention.

Referring now to FIG. 4, the memory unit 304 is shown in more detail. In particular, the portions of the memory unit 304 needed for publish/subscribe processes of the present invention are shown and will now be described more specifically. As shown in FIG. 4, the memory unit 304 preferably comprises: an operating system 402, a topic/node table 404 for a cluster, a message queue 406, a topic/node table 408 for a broker, a dead message queue 410, a subscribing module 412, a publishing module 414, a forwarding module 416, a path selection module 418, a traffic control module and administration module 420, a broker module 422, a direct publishing module 424, and a delivery control module 426. As noted above, the memory unit 304 stores instructions and/or data that may be executed by processor 302. The instructions and/or data may comprise code for performing any and/or all of the techniques described herein. These modules 402-428 are coupled by bus 308 to the processor 302 for communication and cooperation to provide the publish/subscribe architecture 200. Those skilled in the art will recognized that while the present invention will now be described as modules or portions of a memory unit 304 of a computer system, the modules or portions may also be stored in other media such as permanent data storage device 306 and may be distributed across a network having a plurality of different computers such as in a client/server environment.

The operating system 402 is preferably one of a conventional type such as, WINDOWS®, SOLARIS® or LINUX® based operating systems. Although not shown, the memory unit 304 may also include one or more application programs including, without limitation, word processing applications, electronic mail applications, financial applications, and web browser applications.

The memory unit 304 stores a topic/node table 404 for a cluster 212. Since a cluster 212 is a collection of brokers, the cluster topic/node table 404 provides a global map of topics and associated nodes for the entire cluster 212. The cluster topic/node table 404 has an exemplary structure including a pair of topic name and corresponding node list. The topic name specifies which subscriptions should be propagated. A subscription is propagated if its topic matches the string specified in this field. The node list is a list of nodes to which the subscriptions that match this topic should be propagated.

The message queue 406 stores messages that have been received from other nodes and that need to be forwarded to other nodes or distributed locally to subscribing applications. The message queue 406 is accessible to the broker 210.

The topic/node table 408 for a broker 210 is similar to the cluster topic/node table 404 but only limited to a specific broker 210. In an alternate embodiment, the broker topic/node table 408 can be part of the cluster topic/node table 404.

The dead message queue 410 is a queue for storing messages that cannot be delivered. Messages that have been processed by the present invention are deposited in the dead message queue 410 if a broker 210 is unable to deliver them.

The subscribing module 412 is used to establish a subscription to a topic for a node and to unsubscribe from a topic. The processes performed by the subscribing module 412 are described in detail below with reference to FIGS. 8A and 8B.

The publishing module 414 is used to identify subscribers to a topic and transmit messages to subscribers dynamically. The processes performed by the publishing module 414 are described in detail below with reference to FIG. 6.

The forwarding module 416 is used by a node to local subscribers to receive messages, and node to which to transmit a message. The processes performed by the forwarding module 416 are described in detail below with reference to FIG. 7.

Figure 13A:
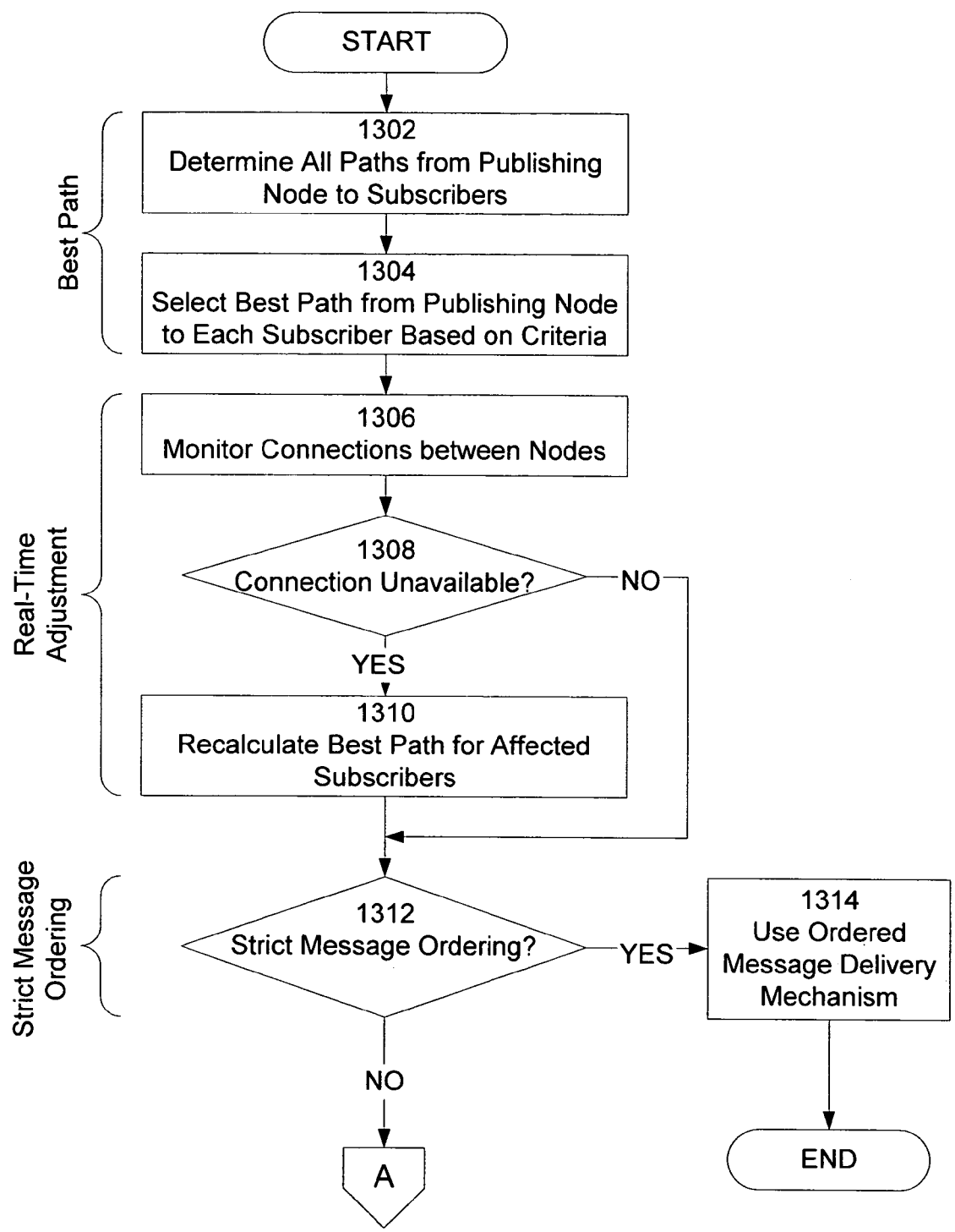
FIGS. 13A and 13B are a flowchart for a preferred method for selecting and allocating paths for delivering messages.
Figure 13B:
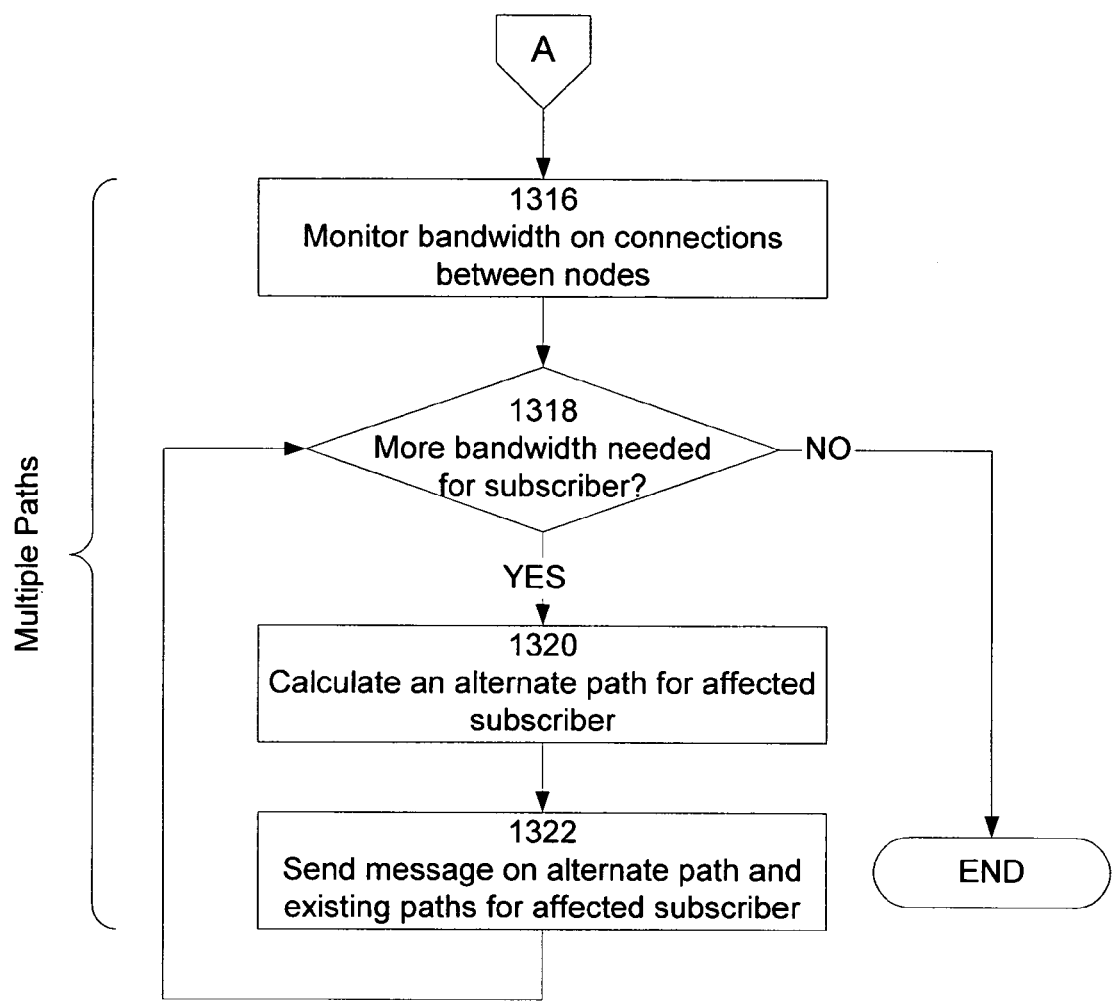

The path selection module 418 is used to dynamically select a path for distribution or publication of a message. The processes performed by the path selection module 418 are described in detail below with reference to FIG. 13.

Figure 10:
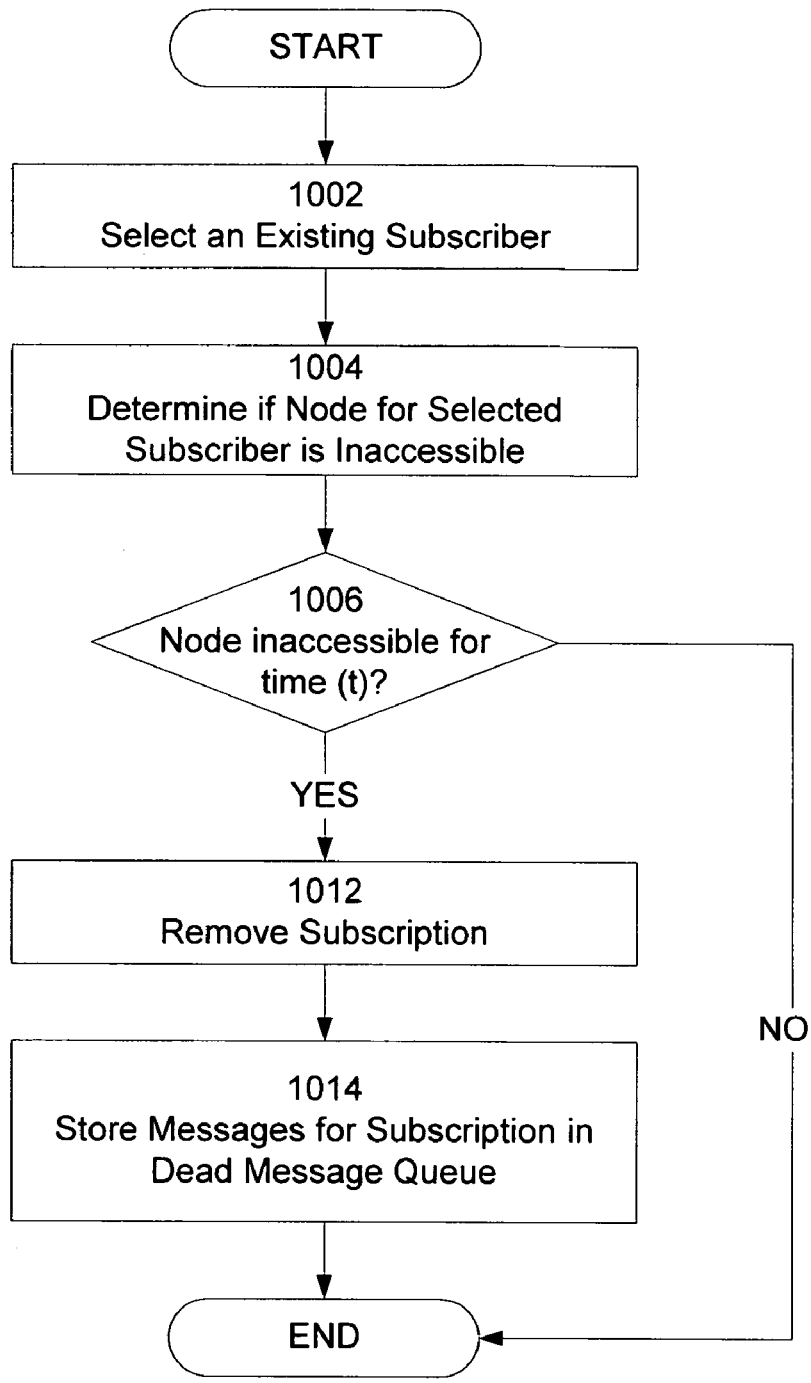
FIG. 10 is a flowchart for a preferred method for automatically removing subscriptions according to the present invention.
Figure 11:
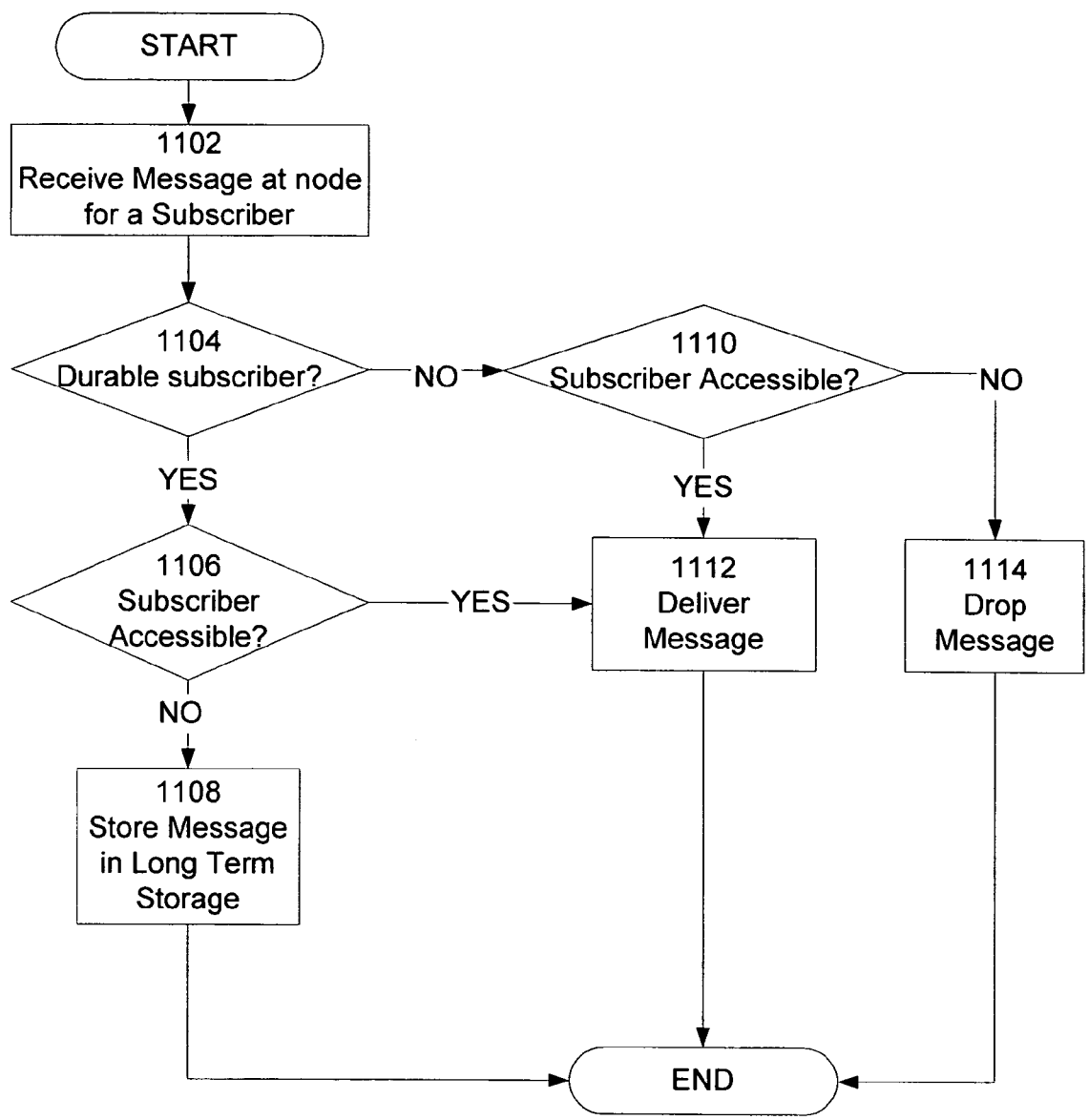
FIG. 11 is a flowchart for a preferred method for sending messages to durable subscribers in accordance with the present invention.

In one embodiment, the traffic control and administration module 420 is a set of instructions and other appropriate elements that enable nodes 110 to monitor, control, and/or otherwise administer a single or clustered MOM topology. For example, the traffic control and administration module 420 can a) maintain and update configuration, runtime, and/or session data for one or more of the nodes 110 and/or originating and destination nodes 110, b) provide buffer management, multi-threaded services, and/or data structure management, c) provide initialization parameters to at least some of the nodes 110, d) manage groups of objects (e.g., groups of transaction, originating, and/or destination nodes 110; groups of software application programs 108; groups of users authorized to access software application programs 108; groups of nodes 110 that host particular software application programs 108; groups of licenses, etc.), e) manage relationships between objects in response to messages communicated between one or more nodes 110, f) provide one or more common services (e.g., encryption/decryption, path routing, message parsing, message format manipulation to, for example, conform a message format to a compatible format) to the nodes 110, and/or g) provide load balancing based on, for example, processor usage/availability, network usage/availability, memory usage/availability, software application program usage/availability, message length, and/or message volume. The traffic control and administration module 420 also provides for automatic expiration of subscribers, processing messages for durable subscribers, and bandwidth modification as described below in more detail with reference to FIGS. 10, 11, and 15.

Figure 12:
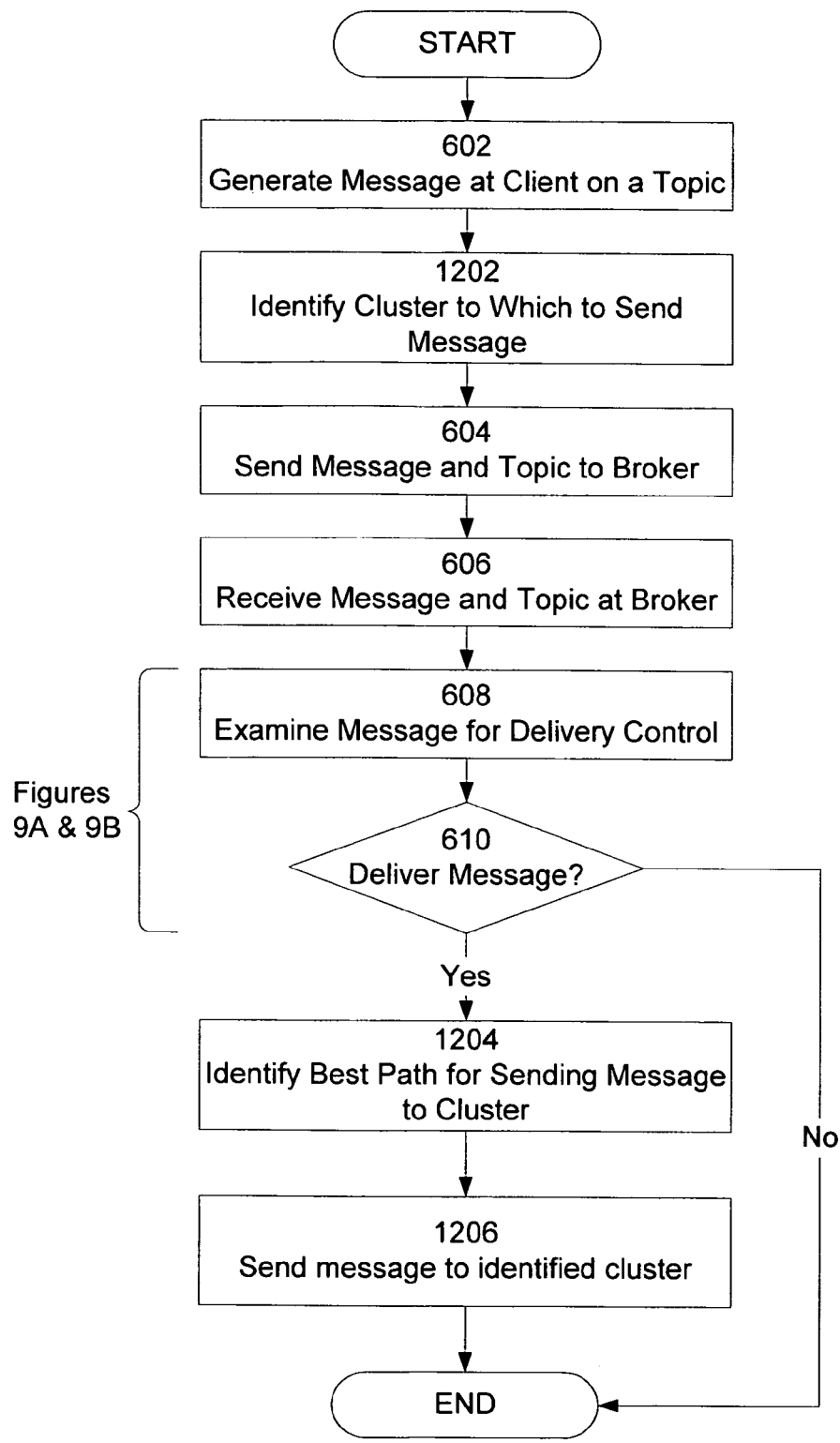
FIG. 12 is a flowchart for a preferred method for publishing directly to a cluster in accordance with the present invention.

The direct publishing module 424 provides instructions for direct publishing of message to a cluster. The present invention advantageously allows the infrastructure of the present invention to be used manually by brokers to publish to an existing cluster. The steps performed by the direct publishing module 424 are described in detail below with reference to FIG. 12.

The delivery control module 426 provides instructions to determine whether messages can be delivered. In particular, the delivery control module 426 checks for permissions, removes duplicate messages, checks buffer availability, and applies filters or selectors to messages to determine whether they should be delivered. The processes performed by the delivery control module 426 are described in detail below with reference to FIGS. 9A and 9B.

The broker module 422 is used to create instances of brokers 210 with the functionality that has been described above with reference to FIG. 2. The broker module 422 manages the creation and deletion of broker instances to ensure the proper operation of the publish/subscribe architecture 200.

Those skilled in the art will recognize that, although the various processes and their functionality have been described with respect to particular embodiments, these processes and/or their functionality can be combined into a single process or into any combination of multiple processes. The processes can also be provided using a combination of built-in functions of one or more commercially available software application programs and/or in combination with one or more custom-designed software modules.

The methods and processes associated with the present invention will now be described. In general, these methods will be described with reference to a minimum number of brokers, publishers, and/or subscribers required to perform the process being described, however, those skilled in the art will recognize that all the methods are applicable groups of brokers, clusters, publishers, and/or subscribers. Moreover, the methods are described in relation to a broker and associated broker topic/node table and administrator, however, it should be understood that the methods are equally applicable to a cluster and associated cluster topic/node table and administrator. Specifically, with the present invention, a cluster of brokers appears to have the same functionality as a single broker to brokers outside the cluster. Other brokers outside the cluster do not need to know what is inside the cluster, the number of brokers in the cluster or the rules or subscriptions within a cluster. This advantageously allows the dynamic subscription and routing methods of the present invention to scale up over any number of sites using various levels of clustering.

Publishing a Message.

Figure 5:
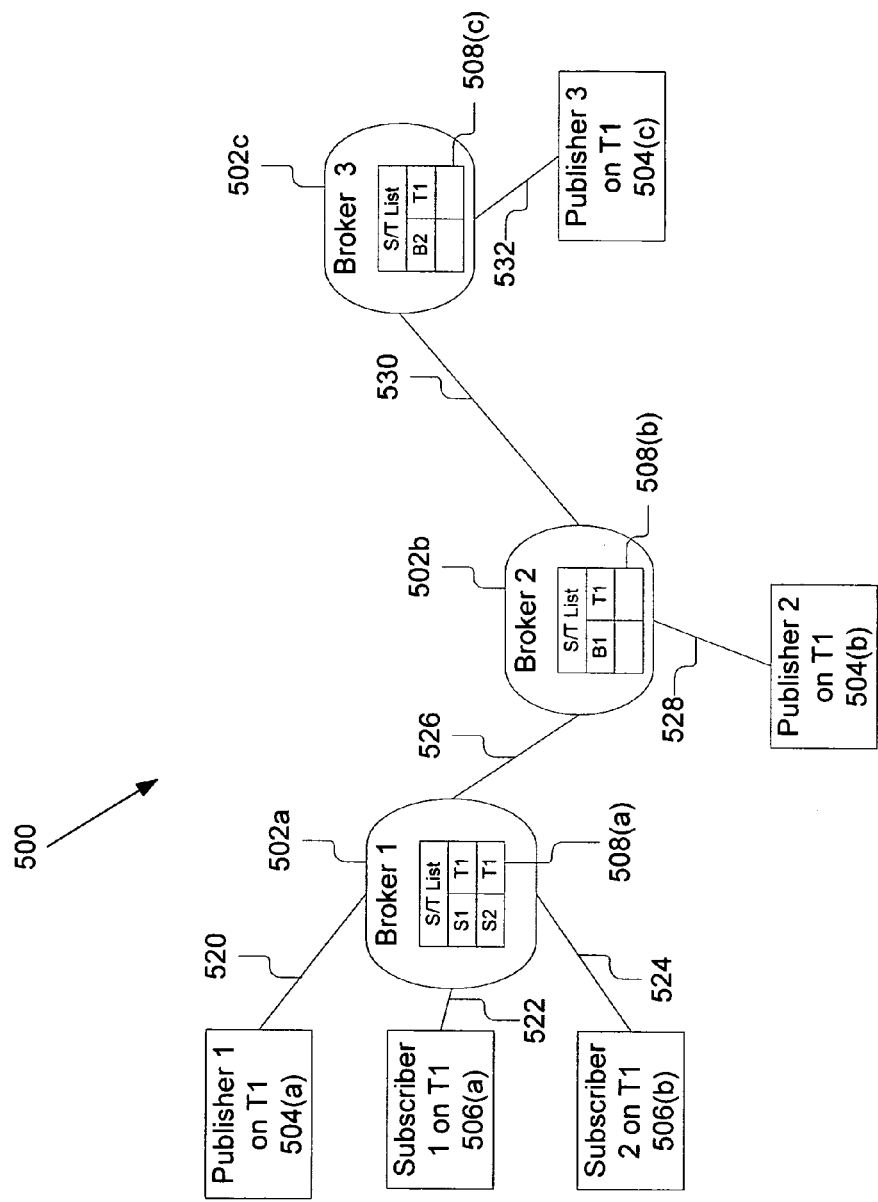
FIG. 5 is a block diagram of an exemplary arrangement of publishers, subscribers and brokers.
Figure 6:
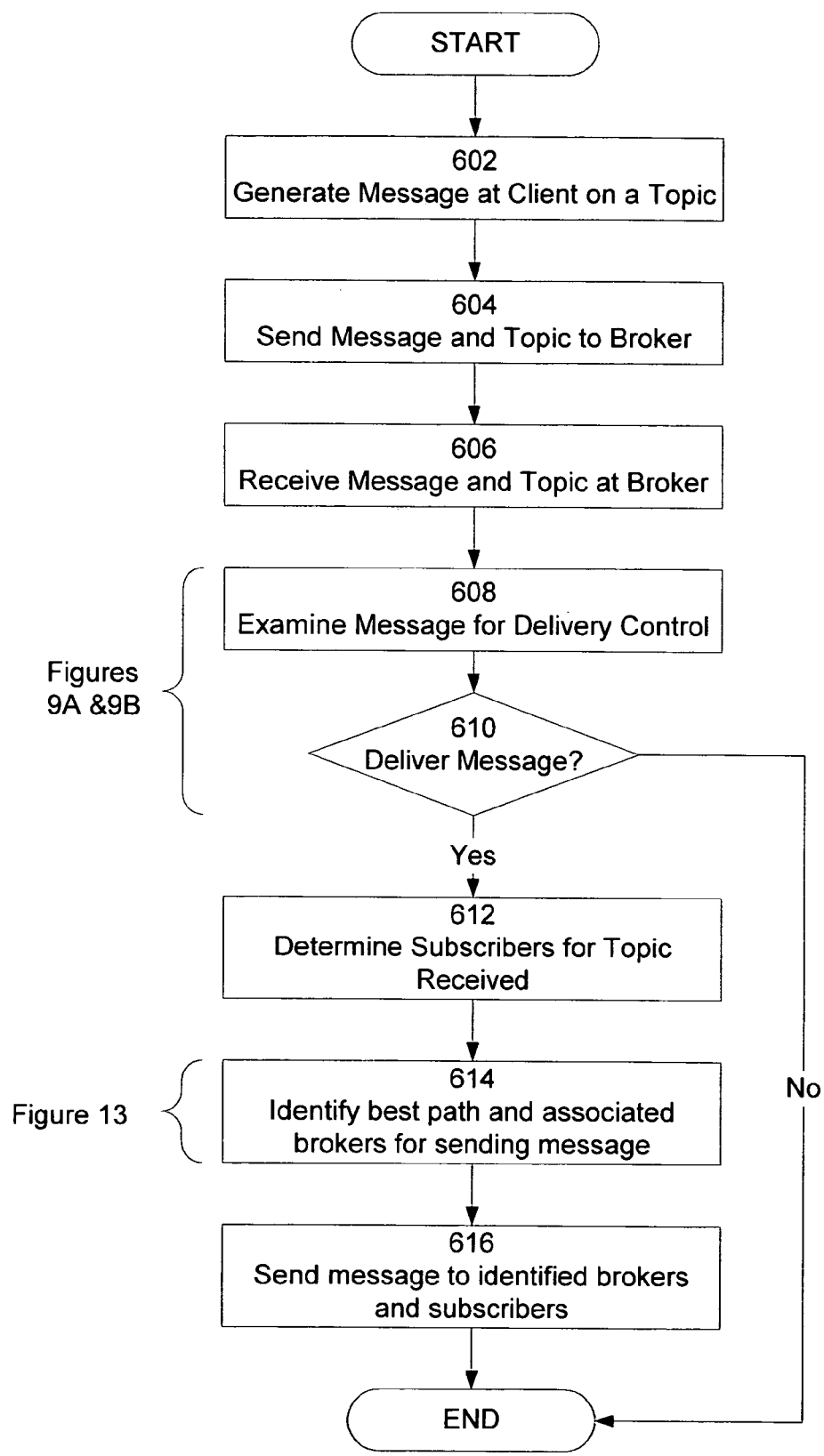
FIG. 6 is a flowchart for a preferred method for publishing a message according to the present invention.

Referring now to FIGS. 5 and 6, one embodiment of the method for publishing messages according to the present invention will be described. FIG. 5 shows an exemplary publish/subscribe architecture 500 that is used as an example to illustrate the operation of the present invention.

FIG. 6 is a flowchart of one embodiment for publishing messages. The method begins with a message being generated 602 by a client application on a topic, for example, by a Publisher 1 504(*a*) on Topic T1. Then the message and the topic are sent from the client application, Publisher 1 504(*a*), to a broker, Broker 1 502*a*. This is a particular advantage of the present invention because the client application does not need to be involved in managing the connection between the broker 502 and other subscribers. The client application merely needs to send the message to the broker 502 with a corresponding topic. Next, the message and topic are received 606 at the broker, Broker 1 502*a* and store message in the message queue 406 (not shown). The broker examines 608 the message for any delivery control issues. This process described in detail below with reference to FIG. 9. More specifically, the present invention minimizes the number of messages sent, and thus the amount of bandwidth that is consumed. One way in which this is accomplished is by reviewing messages when they are received from a publishing client and before the broker tries to transmit them. For example, step 608 determines whether the broker has the permissions to send the message, whether the message is a duplicate. This is done by the dynamic routing architecture underlying the publish/subscribe architecture 200. In step 610, the method tests whether the message can be delivered. If not, the method ends without performing further computations necessary to deliver the message. If the message is deliverable, the method continues to determine 612 the subscribers for the topic provided by the client application. This is preferably done by accessing the topic/node table 408. The topic provided by the client application is compared to topic name in the table. The node list corresponding to the matching topic entry in the table identifies the nodes to which the message will be delivered. After the nodes to which the message must be delivered have been identified, the broker identifies 614 the best path and the associated brokers for sending the message. Using the node list identified in step 612, the broker determines the best path for example, the paths with least number of nodes to traverse. The preferred method for identifying the best path is described in more detail below with reference to FIG. 13. However, those skilled in the art will recognize that a variety of metrics may be used to determine the best path such as, but not limited to, bandwidth availability, number of hops, bottle neck delays, shortest path, and shortest time. Once one or more paths have been selected for delivering the message to all subscribers, the method sends the message and topic to the brokers and subscribers determined in step 612 using the path identified in step 614. This completes the process of publishing a message in the publish/subscribe architecture 200 the present invention.

Forwarding a Message.

Figure 7:
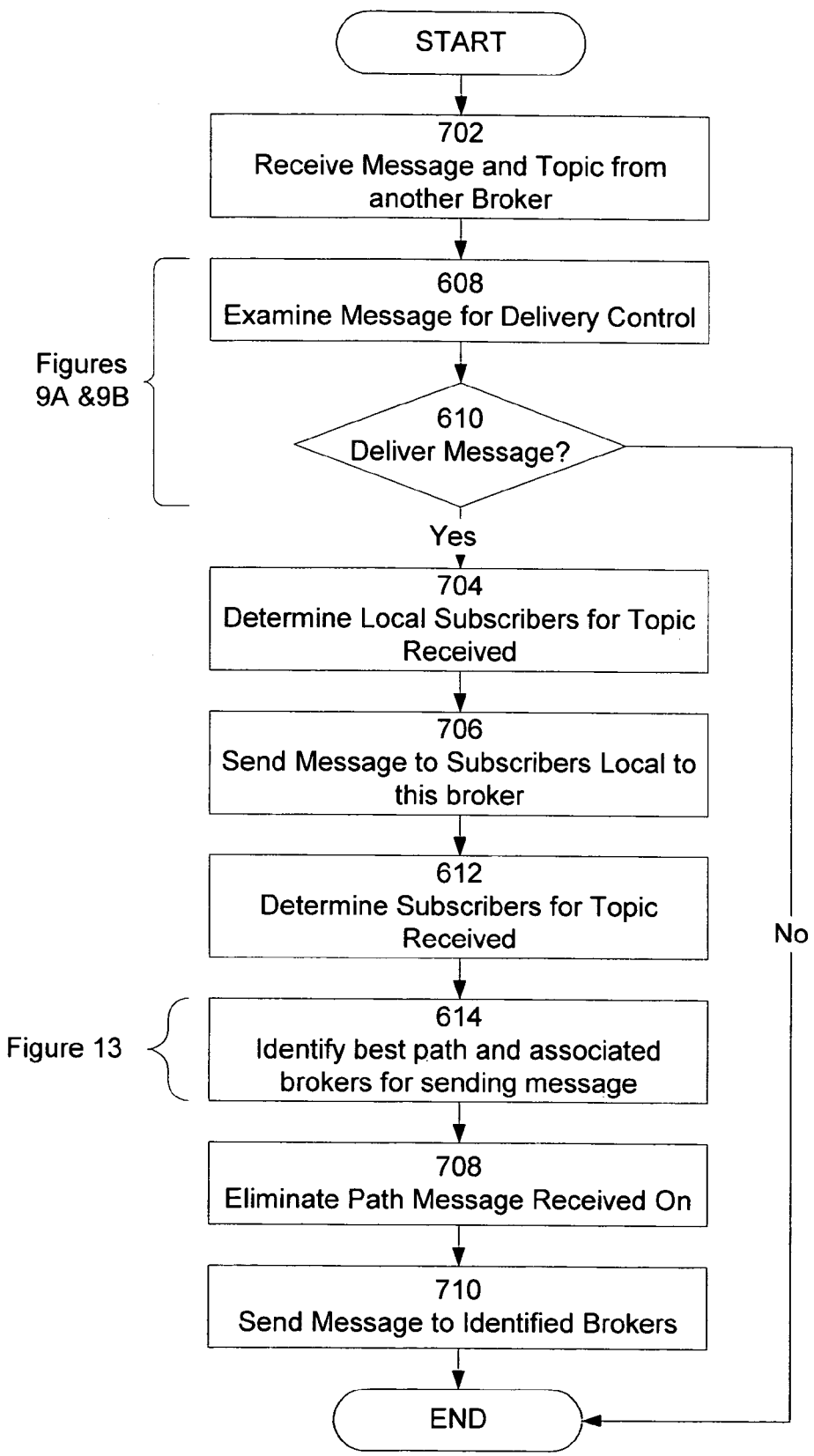
FIG. 7 is a flowchart for a preferred method for forwarding a message according to the present invention.

Referring now to FIG. 7, one embodiment of the method for forwarding messages received is described. Since some of the processes are the same as the publishing method shown and described above with reference to FIG. 6, like reference numerals have be used to indicate like or similar processes. Once a message has been sent from the publishing node it maybe sent to another node. When the message and topic are received 702 at a forwarding broker from another broker, the node processes the message as detailed below and shown in FIG. 7. The message is first examined 608 for delivery control and tested whether the message can be delivered 610 similar to publishing method. If the message cannot be delivered (e.g., subscriber existed, but by the time the message could be delivered, the subscriber was gone), the processes ends and the message is placed in the dead message queue 410. If the message can be delivered, the process first determines 704 and identifies local subscribers for the topic and message that have been received. A local subscriber refers to client application coupled to the broker that is a subscriber, or in the case of a cluster, any client application coupled to the cluster. This can be determined by accessing the broker topic/node table 408 (or the cluster topic/node table 404) to see what applications have entries in the table. Next, the process sends 706 the message to the subscribers local to this broker. This process and the underlying addressing are all managed by the present invention using the dynamic routing architecture. Next, the forwarding process determines 612 whether there are other subscribers, in addition to the local ones, that have subscribed to the topic that has been received. Then the best path and associated brokers are determined 614 as has been described above. Since this is forwarding broker, the message was received from another broker. Thus, the process next eliminates the path the message was received on from the best path list generated in step 614. This eliminates redundant traffic and prevents the message from being sent back to the node that sent it to this forwarding broker. It should be understood that these steps are particularly advantageous because the broker to whom the message and topic are forwarded, dynamically determines the nodes to which to further forward the message, and therefore can take in to account changes in the network topology that may have occurred. Finally, in step 710, the message is sent to the brokers in the best path list as modified by step 708, and processing by this broker is complete.

Subscribing to a Topic.

Figure 8A:
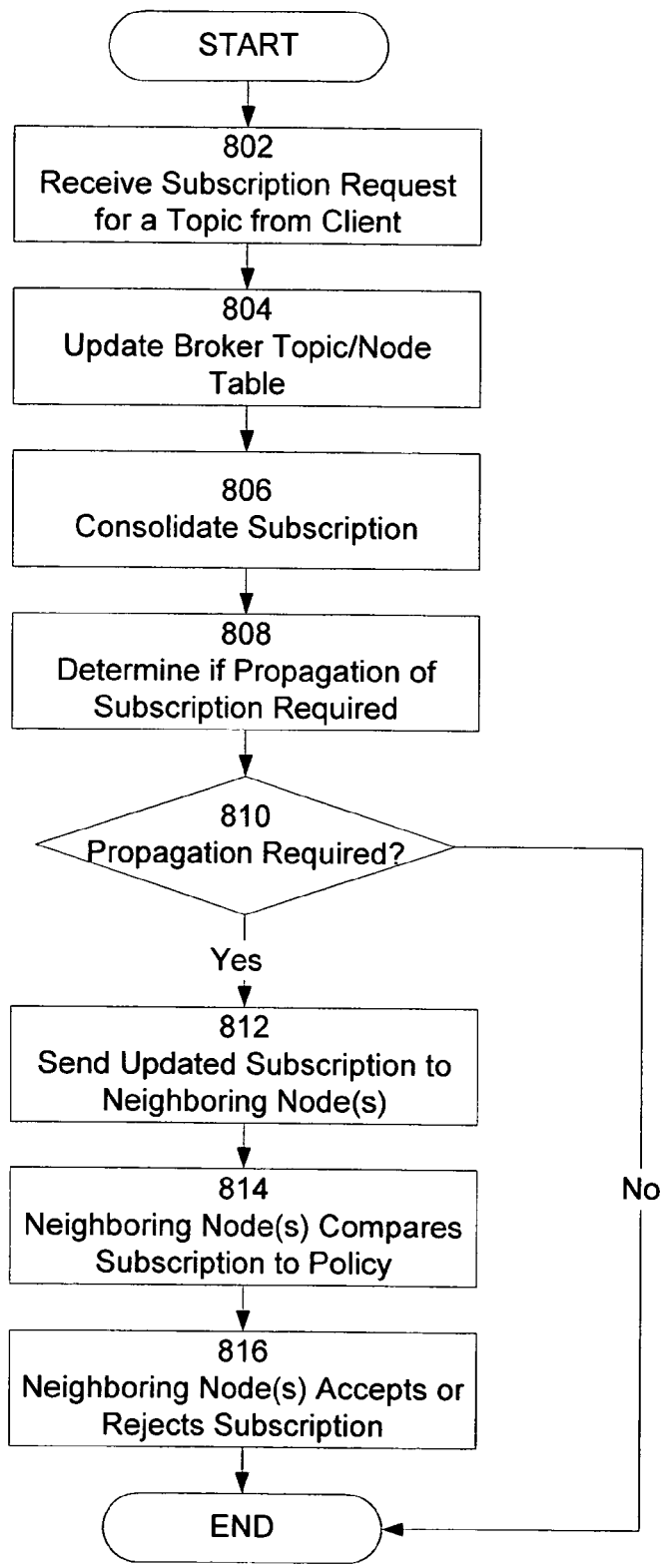
FIG. 8A is a flowchart of a preferred method for subscribing to a topic.

Referring now to FIG. 8A, one embodiment of the preferred method for subscribing to a topic is shown. The method begins with a subscription request being received 802 at a broker from a client. The subscription request preferably includes: a topic, a subscription type, such as whether it is durable, any selectors or filters that should be applied to the subscription and other subscription parameters as will be understood to those skilled in the art. Then the broker updates 804 the broker topic/node table 408 to add the requesting client as a subscriber to the topic provided by the client. The broker further processes the subscription and consolidates 806 the subscription with other subscriptions the broker is handling. For example, there may be multiple subscribers to the same topic. These multiple subscriptions are consolidated into a single subscription to that topic rather than maintaining multiple subscriptions. Similarly, there may be multiple subscriptions to the same topic, but each subscriber applies a different selector to the topic. For example, a first subscriber may already subscribe to topic T1 with a selector that filters the messages on a first value, while a second subscriber submits a request to also subscribe to topic T1 but with a selector that filters the message on a second value. These selector rules associated with subscriptions are also consolidated such that if necessary the subscription to topic T1 with the selector having a second value will be propagated if it allows receipt of messages that are filtered out by the subscription to topic T1 with the first value. Once the subscription and the selector rules have been consolidated, the method determines 808 if propagation of the subscription or the selector rules is required. For example, if there is already a subscriber to the topic, then no additional notification to the publishing node or other nodes is required. However, the new subscription, even if to a topic already being subscribed to, may have a different parameter associated with it as compared to the existing subscription. For example, the new subscription may be durable, where the existing one was not. Similarly, the new subscription may apply no or a different selector to the subscription where the existing subscription has a selector that more limited. Thus, there are instances when the new subscription, even if to a topic already being subscribed, must be propagated to other nodes. In step 810, the method determines whether propagation is required. If not the method is complete and ends. However, if propagation is required, then the broker sends 812 an updated subscription (the consolidated subscription—for example a single subscription on topic T1) to all its neighboring nodes. Upon receipt of the updated subscription request by each of these neighboring nodes, they in turn will send it to their neighboring nodes until the updated subscription request has be propagated across the entire distributed computing system 100. Those skilled in the art will recognize that it is common for a node to receive multiple or duplicate updated subscription requests that were generated initially by a single subscription requests. These duplicate updated subscription requests provide information about the network that can be used by the node to determine which is the best path for routing messages as will be described with reference to FIG. 13A. When the subscription request is received at each of the neighboring nodes, the neighboring nodes compare 814 the subscription request to their security policy. Each node includes an administrator and an associated security policy that dictates nodes from which it can accept subscriptions. At each neighboring node, the neighboring node either accepts or rejects 816 the subscription request based on that node's particular security policy. Once the subscription request has been sent to all nodes in the network, the subscription process is complete, and all the broker topic/node tables 408 between publishers and the broker should be updated to reflect the new subscription.

Figure 8B:
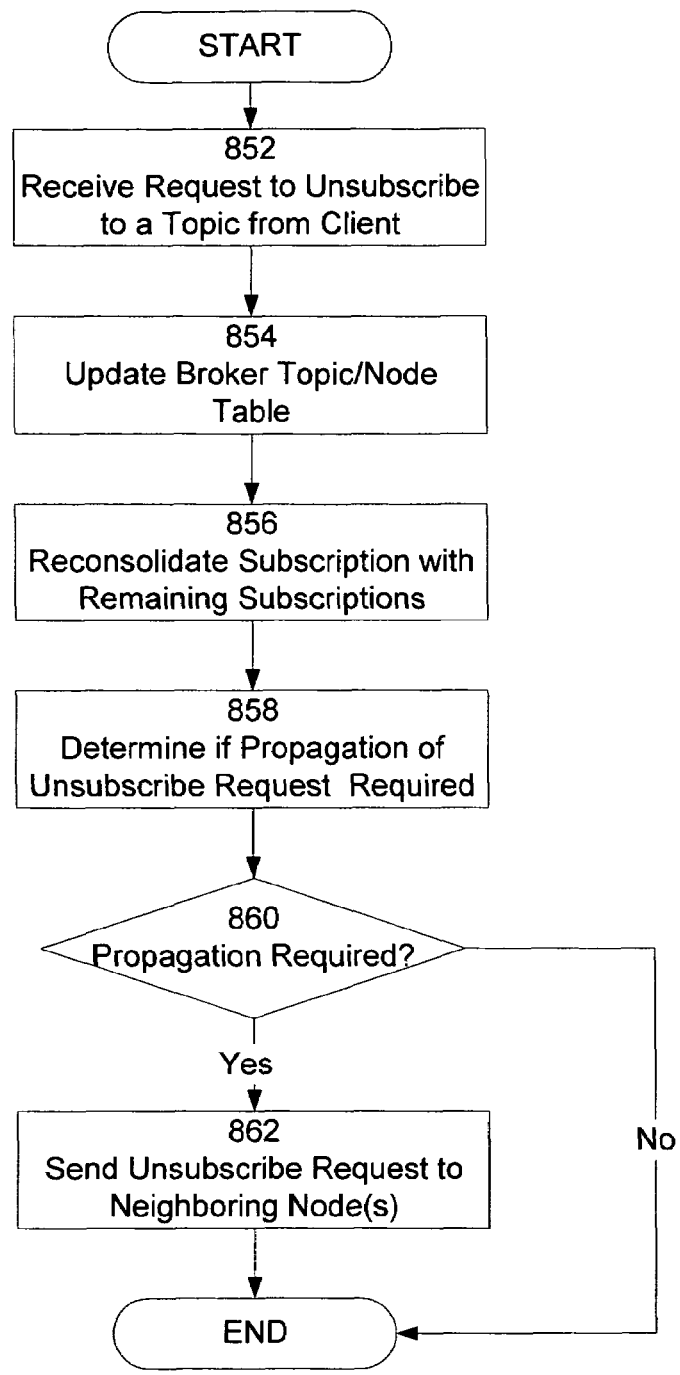
FIG. 8B is a flowchart of a preferred method for unsubscribing to a topic.

Referring now to FIG. 8B, one embodiment of the preferred method for unsubscribing to a topic is shown. The method begins with the broker receiving 852 from a client a request to unsubscribe from a topic. The request to unsubscribe preferably includes at least a subscription identification and a topic, but may also include a subscription type, such as whether it is durable, any selectors or filters that should be applied to the subscription and other subscription parameters as will be understood to those skilled in the art. Then the broker updates 854 the broker topic/node table 408 to remove the requesting client as a subscriber to the topic provided by the client. The broker further processes the request to unsubscribe by consolidating 856 the remaining subscriptions the broker is handling, without the subscription identified in the request to unsubscribe. This is done is the same manner has been described above for subscribing, just without the subscription identified in the request to unsubscribe. Once the remaining subscriptions have been reconsolidated, the method determines 858 if propagation of the reconsolidated subscription is required. In step 860, the method tests if propagation is required. If not the method is complete and ends. However, if propagation is required, then the broker sends 862 the reconsolidated subscription to the neighboring nodes, which in turn propagate the reconsolidated subscription.

Delivery Control.

Figure 9A:
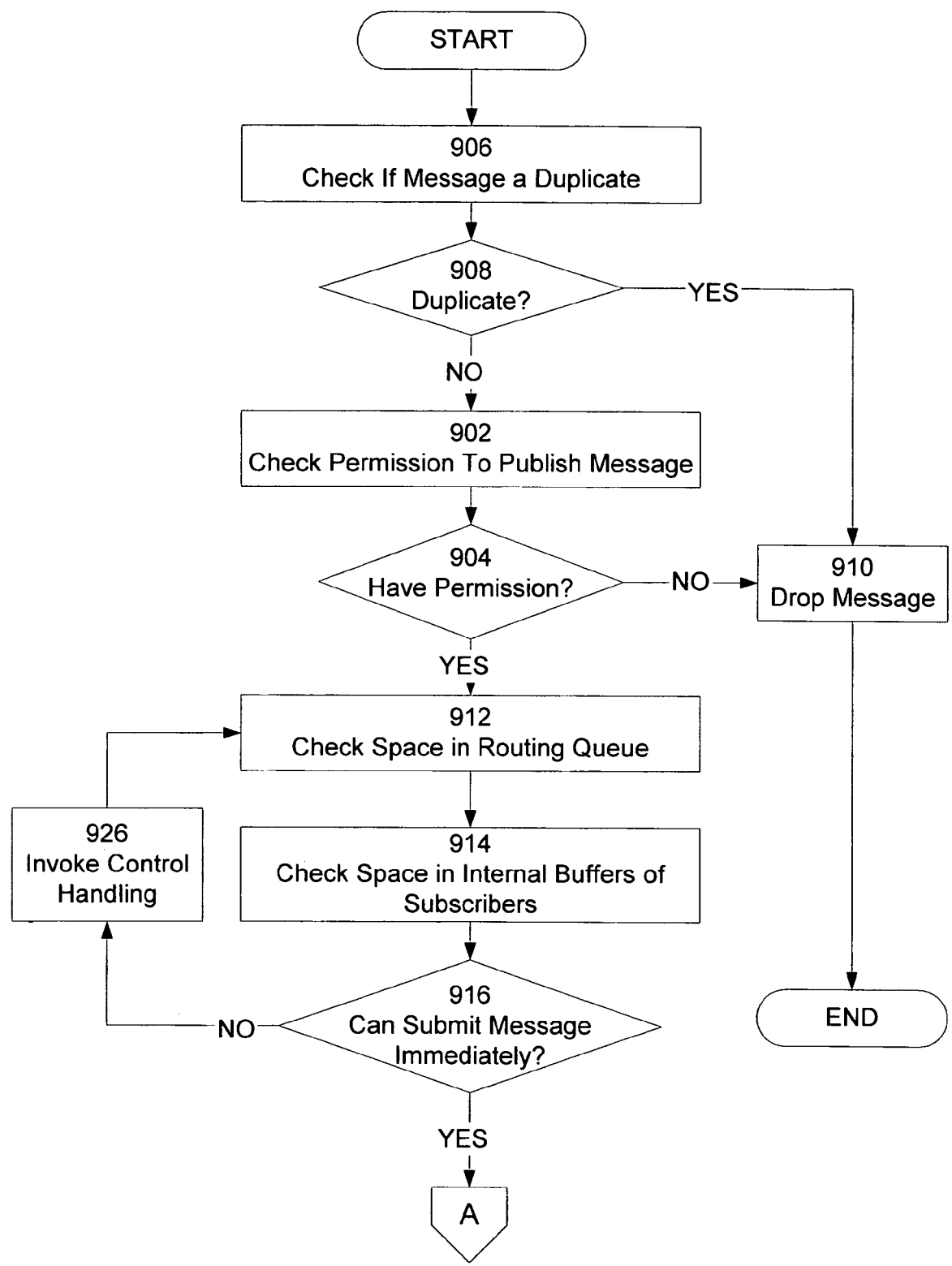
FIGS. 9A and 9B are a flowchart for a preferred method for examining and testing whether to deliver a message according to the present invention.
Figure 9B:
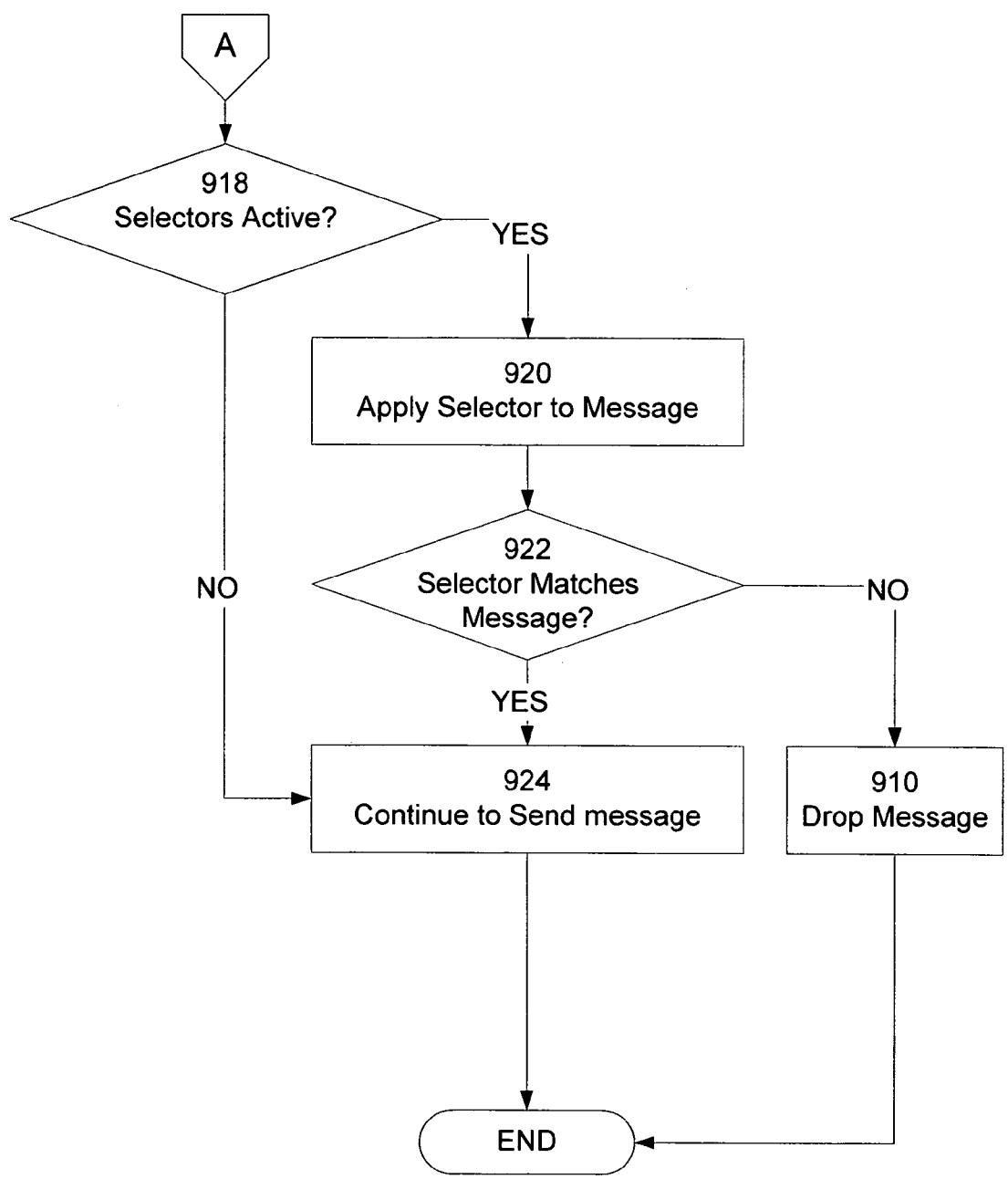

Referring now to FIGS. 9A and 9B, various delivery control mechanisms will be described. It will be understood to those skilled in the art that these are just a few such delivery control mechanisms than may be applied by respective nodes and brokers as messages are published over the distributed computing system 100. The mechanisms are designed to limit the number of messages passed between brokers and thereby maximize usage of available bandwidth for useful message traffic. Each mechanism may be applied in a different order or individually even though set forth in a particular order in FIGS. 9A and 9B. Furthermore, those skilled in the art will recognize that the broker processes some of these mechanisms while others are performed by the protocol layers associated with the dynamic routing architecture under and supporting the broker.

A first control mechanism checks 906 if the message is a duplicate message. The messaging protocols and administrator preferably maintain a search list of messages that have been received and are able to compare the message identification number with those identification numbers stored in the search list. Then the underlying protocols test 908 whether the message is a duplicate. If the message is a duplicate, the message is dropped 910. If the message is not a duplicate, the permissions and actions allowed by the broker are reviewed. The process first retrieves 902 the permissions of the broker with regard to publishing messages. Then the method tests 904 whether the broker has permission. If the broker does not have permission to publish messages on this topic, the process continues to step 910 where the message is dropped and remove from the message queue 406. In another embodiment, the message may also be moved to the dead message queue 410. If the broker has permission to publish the message, the messaging protocols determine 912 if there is for space in the routing queue for the message and determine 914 if the internal buffers of the subscribers have sufficient space to store the message. If not the method invokes 926 control handling measures. Those skilled in the art will recognize that various different control handling measures may be used to adjust the message flow so that the message may be published. Examples of control handling mechanism include, but are not limited to, slowing down the rate at which the publisher can send message, sending notifications about the buffer conditions, and discarding the oldest messages from the buffers. After invoking control handling, the method returns to step 912 and loops until there is space available or a timeout error occurs. If the message can be submitted immediately, the broker tests whether there are any selectors or filters active. If not, the process continues in step 924 to send the message. If the selectors are active, the process proceeds to step 920 to apply the selector to the message. If the broker determines that the selector matches the message (e.g., the message should be delivered) then the process continues in step 924 to send the message. However, if the selector does not match the criteria, the message is dropped 910.

Automatic Termination of Subscriptions.

Yet another method to optimize the publish/subscribe architecture 200 is the automatic termination or expiration of subscriptions. In order to further reduce the overhead and administration of subscriptions in the system 100, the present invention terminates subscriptions if a node or client has been inaccessible for a predetermined amount of time. It should be understood that this termination of the subscriber is only local to this broker, and other brokers may continue to maintain the subscription, or terminate it later according to policies specific to that broker. The inaccessibility of a node for a predetermined amount of time indicates that a possible failure in the node, client or connection that makes sending messages to that subscriber a waste of available bandwidth. The method begins by selecting an existing subscriber 1002. Then the method determines 1004 whether the node for the selected subscriber is inaccessible by accessing the protocol layers and determining whether the connection to a node and broker are accessible. The then method determines how long the node has been inaccessible. Next, the method tests 1006 whether the node has been inaccessible for greater than a predetermined amount of time (t). If not, the subscription is maintained and the method ends. If so, the broker removes the subscription in step 1012. Removing 1012 the subscription is done in a similar manner to how a subscription is created, by first removing the subscription in the broker topic/node tables 408. In one embodiment, the broker also sets the subscription so that all messages received for the subscription are stored 1014 in the dead message queue 410. Thus, in the event the subscriber returns some the message may be available for retrieval from the dead message queue 410. After the subscription has been removed, the process is completes and the other subscriptions may be similarly tested for removal.

Durable Subscriptions.

One novel concept in the publish/subscribe architecture 200 of the present invention is message handling for a durable subscriber. A durable subscription is one that persists even though there may be connection loss, node failure or client failure that prevents real-time communication with the subscriber. For durable subscriptions, the messages published to a topic are stored for the subscriber until the subscriber reconnects to the distributed computing system 100 and renews the connection at which time the messages can be delivered. Deliver of messages to durable subscribers start in the same manner as processing of all messages with receipt 1102 of a message on a topic at the node for a subscriber. The process then determines 1104 if the subscriber is a durable subscriber. If so, the method determines 1106 whether the subscriber is accessible. If the subscriber is not accessible, the message is stored 1108 in long-term storage 306. If and when the subscriber becomes accessible, the method will retrieve the messages from long-term storage 306 and deliver them to the subscriber. If the subscriber is determined 1106 to be accessible, then the message is delivered 1112 without long-term storage in a normal fashion as has been described above. If the subscriber is determined not to be durable subscriber in step 1104, the method processes the message as normal and determines whether 1110 subscriber is accessible. If so, the message is deliver 1112. If not the message is dropped 1114. In one embodiment, the message may be store temporarily by storing the message in the dead message queue 410 in addition to dropping 1114 the message.

Direct Publishing.

Yet another novel feature of the present invention is direct publishing to a specific cluster. The messaging architecture provided by the present invention may be extended to allow specific use of the publish/subscribe capability on a cluster-by-cluster basis. Many of-the steps in direct publishing are similar to publishing generally as has been described above with reference to FIG. 6, so where possible like reference numerals have been used to identify similar steps. The direct publishing begins in the same way as the general case with a message being generated 602 at a client, and the messaging being published to a topic. Then an additional step of identifying 1202 a cluster to which to send the message is performed. This information is added to the message and topic. The message and topic are sent 604 to the broker, received 606 by the broker, and examined 608 for deliver controls as has been already described above. Next, the broker tests 610 whether the message can be sent. If the message cannot be sent, the process terminates without sending the message. If the message can be sent, then the method identifies 1204 the best path for sending the message to the identified cluster. This step is different from the general method in that the method preferably selects a single path for publication of the message since it is being sent to a specific cluster. While the same messaging infrastructure is utilized, the number of messages generated is minimized by only sending messages on a single path from the client application to the identified cluster. For example, the message would not be sent on paths to other clusters from the publishing node even though they subscribe to the same topic. Thus, in this step, the broker must determine the next node in path from the publishing node to the particular cluster. In an alternate embodiment, the broker may distribute the message across multiple paths to get to the cluster, or may identify primary and secondary paths to send the message from the publishing node to the cluster. Once the path has been identified, the message is sent 1206 to the identified cluster using that path. It should be noted that once the message is received at the cluster it is published, as has been described above locally to that cluster. This may mean that the message is propagated to multiple brokers in the cluster and any applications coupled to the cluster and subscribing to the topic.

Path Selection.

One feature of the present invention is the combination of dynamic routing with publish/subscribe architecture. The present invention ensures that dynamic routing is preserved by adjusting path selection based in part on changes to the topology of the network. More specifically, path selection is affected by the criteria used to determine the best path, real-time adjustment to the path based on connection changes, and strict message ordering. The present invention also allows the use of multiple paths to deliver messages on a given topic.

One embodiment of the method for path selection begins by determining 1302 all the paths from the publishing node to the subscribers. Next, the method selects 1304 a best path from the publishing node to each subscriber based on criteria set by the system administrator. The criteria may be a particular attribute of the path, or more complex evaluations with weighted values for each criteria. For example, such criteria may include: paths that have the fewest nodes to traverse, paths that are the shortest in distance, paths that are the fastest, paths with the least traffic, paths with the most available bandwidth, paths that have the fewest bottlenecks, paths with best routing conditions, etc. Those skilled in the art will recognize that there are a variety of criteria in addition to those enumerated, and a variety of algorithms for evaluating the criteria values to select a best path. Any such evaluation techniques and criteria may be used in selecting the best path to each subscriber. Additionally the best paths may be modified by consolidation of paths such that a given path may be the best path because it makes delivering messages to multiple subscribers more efficient that the direct path to each subscriber.

Once a best path to each subscriber has been determined in step 1304, the method then performs real-time adjustment of the best paths. The method monitors 1306 the connections between nodes for changes. Then, the method tests 1308 whether any connections between nodes are unavailable. If there are no unavailable connections, the method continues to step 1312 with no real-time adjustments of the best paths. However, if a connection has become unavailable, the method determines 1310 that subscribers that are affected by the connection not being available, and recalculates 1310 the best paths to those subscribers using the real-time information on connection availability.

The present invention also uses multiple paths in routing messages to subscribers. However, because the latency of any particular path, use of multiple paths may cause messages to be received in a different order from that in which they were sent. To provide additional control, the present invention allows the subscriber to select strict message ordering. When selected, strict message ordering ensures that the publish/subscribe architecture 200 will deliver the messages in the same order in which they were published. The strict message ordering method first tests whether strict message ordering has been selected for the subscription. If so the method, continues in step 1314 to use an ordered message delivery mechanism to deliver the message. For example, the method may send all messages for that subscription using the same path to guarantee that the original message ordering is preserved. Alternatively, a message order number may be added to each message so that the subscriber could ensure that the original message ordering was preserved, and even re-order the message by message order number if necessary. Those skilled in the art will recognize that there are a wide variety of other ordered message delivery mechanisms that may be employed in step 1314. This completes the path selection process for subscriptions where strict message ordering has been set.

If strict message ordering has not been set, then the method can regulate and change paths used to send messages to subscribers based on changing network conditions. The method first monitors 1316 the bandwidth on connections between the nodes. Periodically, the method tests 1318 whether additional bandwidth is needed for a subscriber. If additional bandwidth is not needed then the best path identified above is used to send messages to the subscriber. However, if additional bandwidth is needed for a subscriber, then the method calculates 1320 an alternative path from the publishing node to the subscriber. Then messages are send on both the best path and the alternate path to the subscriber. After step 1322, the method returns to step 1318 to retest the bandwidth needs of the subscriber. The method can loop through steps 1318-1322 to create as many paths as necessary to match the bandwidth needs of a particular subscriber.

Topic Hierarchy.

Figure 14:
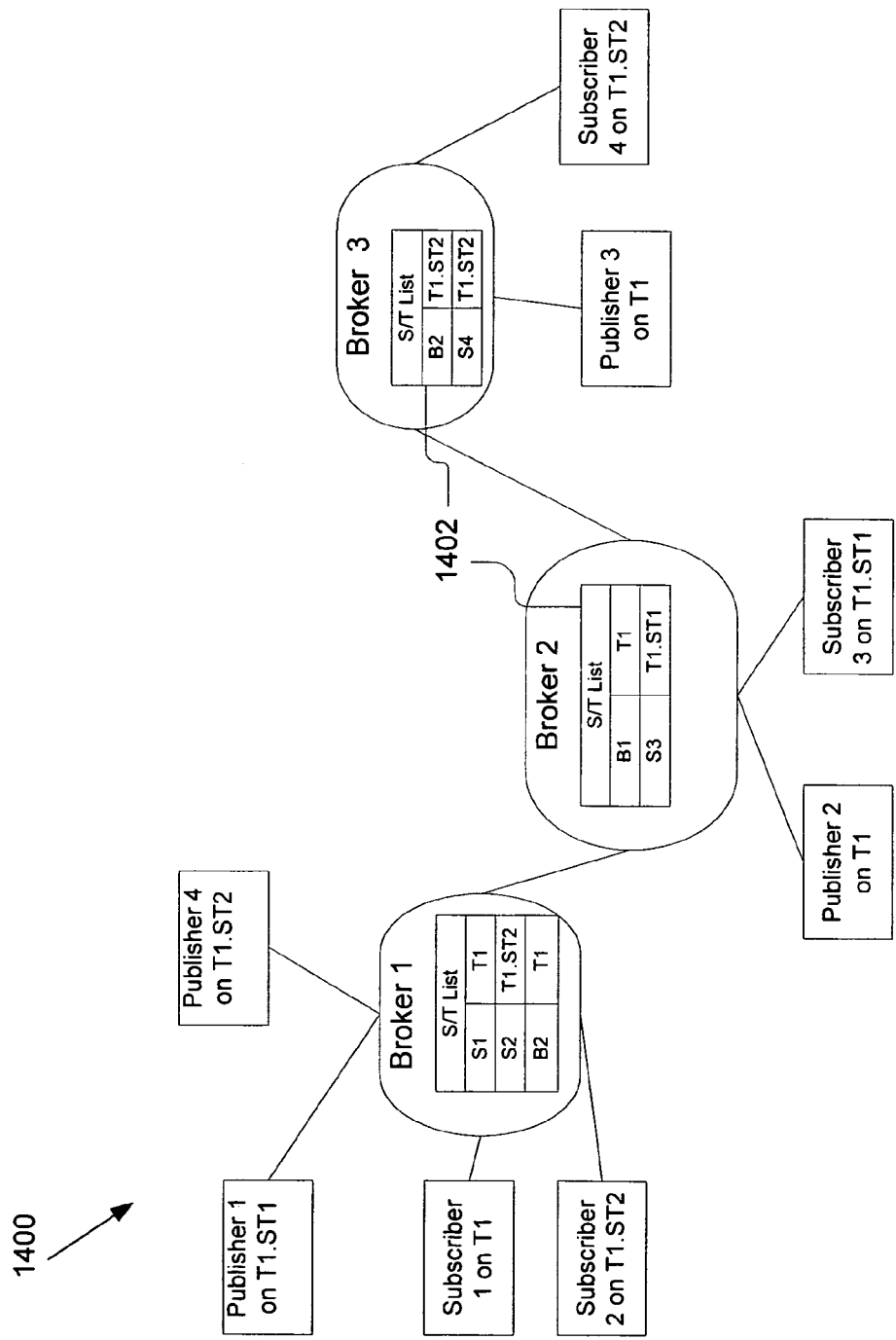
FIG. 14 is a block diagram of an exemplary arrangement of publishers, subscribers and brokers for publishing on subtopics.

Referring now to FIG. 14, an exemplary arrangement 1400 of brokers, publisher and subscribers is shown. The corresponding broker topic/node table 1402 is shown for each broker. FIG. 14 illustrates how the present invention provides topic hierarchy. The prior art provides only multiple topics without hierarchy. However, the present invention allows topics to have subtopic for further refining what messages a subscriber will receive. This provides an added advantage of further optimizing the message traffic to its minimum. Those skilled in the art will recognize that this can logically be extended to include sub-subtopics or any numbers of levels in a topic hierarchy. As illustrated by way of example, publisher 2 publishes on topic T1. This could be both for topics on subtopic ST1 or subtopic ST2. Each subtopic is noted in the corresponding broker topic/node table 1402 as a suffix to the topic name. The absence of a suffix indicates that the subscriber subscribes to all subtopics. For example, if publisher 2 publishes four messages on topic T1; the first two on topic T1, subtopic ST1, and the second two message on topic T1, but subtopic ST2, all four message are send from broker 2 to broker 1, while only the latter two messages are sent from broker 2 to broker 3. This example also illustrates how topic consolidation may occur. As shown in the broker topic/node table 1402 for broker 2, there is only a single table entry for broker B1 because the subtopic subscription of subscriber 2 is subsumed in subscriber 1's subscription to topic 1 regardless of subtopic.

Traffic Control.

Figure 15:
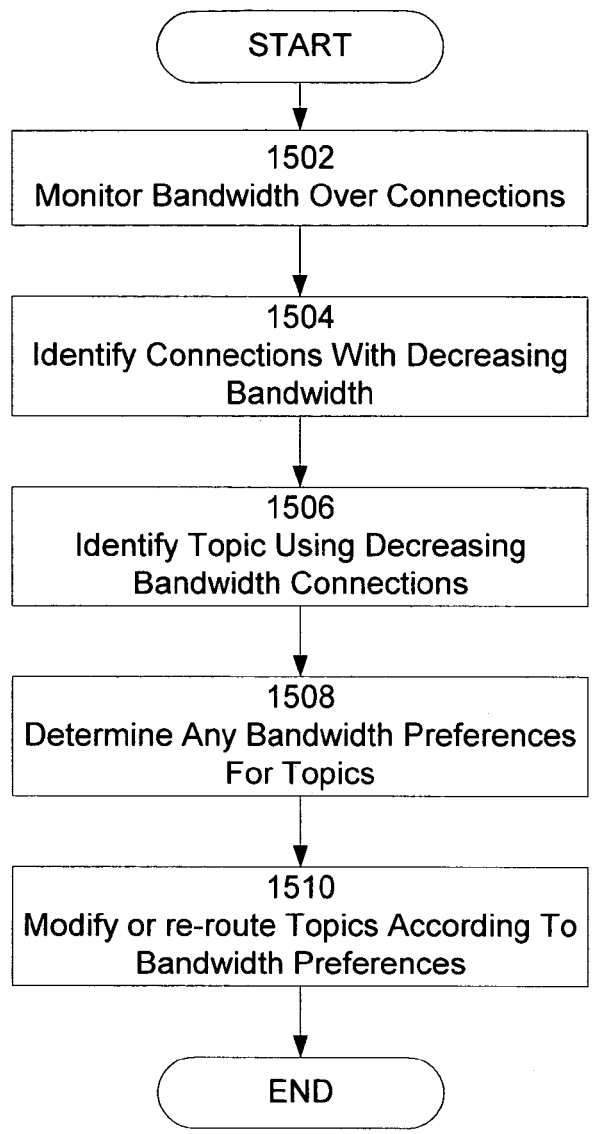
FIG. 15 flowchart of an additional method used to optimize the delivery of messages.

Finally, referring now to FIG. 15, preferred methods for controlling the traffic in the publish/subscribe architecture 200 is shown. The publish/subscribe system 200 of the present invention advantageously also allows the message traffic to be shaped according the bandwidth changes on connections and topic. This process begins by monitoring 1502 the network connections for changes in bandwidth. Then the method identifies 1504 connections with decreasing bandwidth. Next, the system 200 identifies 1506 topics using the connections that have decreasing bandwidth. Then, the method determines 1508 any bandwidth preferences for topics. The present invention allows the administrator to provide preferences as to which topic will get a preference on a given connection. For example, if message on topics A, B and C are all being sent over the same connection, topic A may be more important or have a guaranteed quality of service and thus get a preference over topics B and C. Then the method modifies and re-routes messages by topic according to the bandwidth preferences. Thus, continuing the above example the messages for topics B and C would be re-routed as bandwidth on a given connection decreases, and messages on topic A would have priority to remain on the connection. This method is particularly advantageous because it allows traffic to be shaped on a topic basis. Thus, rather than affecting all subscribers on various topics if connections fail or are reduced in bandwidth, the adverse effects can be limited to messages on a specific topic that may be less important.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A system for dynamically routing a message over a network having a first node and a plurality of other nodes, the system comprising:
   a publisher for generating and sending the message on a topic, the publisher having an output;
   a plurality of subscribers each having an input for receiving the message, at least one of the plurality of subscribers subscribing to the topic; and
   a broker having an input, an output and a topic/node table, the broker associated with the first node, in response to receipt of the message, the broker identifying the topic associated with the message and determining using the topic/node table and the identified topic which of the plurality of other nodes to which to send the message for delivery to the one of the plurality of subscribers subscribing to the topic, the input of the broker coupled to the output of the publisher, and the output of the broker coupled to the inputs of the plurality of subscribers.

2. The system of claim 1 wherein the publisher is a client application program.

3. The system of claim 1 wherein the subscriber is a client application program.

4. The system of claim 1 wherein the broker farther comprises a message queue for storing messages received from the publisher.

5. The system of claim 1 wherein the broker farther comprises a dead message queue for storing messages determined by the broker to be undeliverable.

6. The system of claim 1 wherein the topic/node table is capable of storing a topic and a subtopic for a subscriber or a second broker.

7. The system of claim 1 further comprising:
   a second broker associated with one of the plurality of other nodes having an input and an output, the second broker routing the message in response to receipt of the message, the second broker communicatively coupled to the first broker; and
   a cluster topic/node table, the cluster topic/node table used by the broker and the second broker to determine which of the plurality of other nodes to which to send the message for delivery.

8. The system of claim 1 wherein the broker further comprises a subscribing module for establishing a subscription to the topic by a new subscriber, the subscribing module coupled for communication with the new subscriber, the subscribing module updating the topic/node table with the new subscriber.

9. The system of claim 1 wherein the broker farther comprises a publishing module, the publishing module coupled to the topic/node table, the publishing module determining the subscribers for the topic and a path to the subscribers, the publishing module sending the message to the subscribers over the determined path.

10. The system of claim 1 wherein the broker further comprises a forwarding module having an input and an output for routing messages in response to receipt of the message from another broker, the forwarding module determining which of the plurality of other nodes to which to send the message for delivery, the input of the forwarding module coupled to receive messages from the other broker, the output of the forwarding module coupled to the inputs of the plurality of subscribers.

11. The system of claim 1 further comprising a path selection module coupled to the broker, the path selection module for identifying at least one path through the plurality of other nodes from the broker to the one of the plurality of subscribers, the path selection module providing the identified path to the broker for routing of the message over the identified path.

12. The system of claim 11 wherein the path selection module provides real-time adjustment of the identified path by monitoring connections between the plurality of other nodes and recalculating the best path.

13. The system of claim 1 further comprising a traffic control module for controlling message traffic over the plurality of other nodes, the traffic control module monitoring connections between the plurality of other nodes for changes in bandwidth and re-routing topics according to a bandwidth preference.

14. The system of claim 1 further comprising a delivery control module for eliminating duplicate messages, the delivery control module coupled to the broker to receive messages.

15. The system of claim 1 further comprising a delivery control module for filtering messages, the deliver control module coupled to the broker to receive and send messages, the deliver control module comparing a selector to the message received from the broker and dropping the message if it does not match the selector.

16. The system of claim 1 further comprising a direct publishing module having an input and an output for publishing a message directly to a cluster, the direct publishing module coupled to the broker, the direct publishing module receiving a cluster identification, determining a path to the cluster and sending the message to the cluster.

* * * * *

UNITED STATES PATENT AND TRADEMARK OFFICE
CERTIFICATE OF CORRECTION

PATENT NO. : 7,406,537 B2 Page 1 of 1
APPLICATION NO. : 10/773803
DATED : July 29, 2008
INVENTOR(S) : William Cullen It is certified that error appears in the above-identified patent and that said Letters Patent is hereby corrected as shown below:

On line 13 of the "Abstract" section, please delete "use" after "module is" and replace with --used--

In claim 4, Column 19, line 36, please delete "farther" after "broker" and replace with --further--

In claim 5, Column 19, line 39, please delete "farther" after "broker" and replace with --further--

In claim 15, Column 20, line 42, please delete "deliver" after "the" and replace with --delivery--

In claim 15, Column 20, line 44, please delete "deliver" after "the" and replace with --delivery--

Signed and Sealed this

Twenty-first Day of October, 2008

JON W. DUDAS
*Director of the United States Patent and Trademark Office*